(12) United States Patent
Sonnichsen et al.

(10) Patent No.: US 9,533,865 B2
(45) Date of Patent: Jan. 3, 2017

(54) BEVERAGE DISPENSER HAVING LIQUID LEVEL GAUGE

(71) Applicant: GrowlerWerks, Inc., Portland, OR (US)

(72) Inventors: Brian Edward Sonnichsen, Portland, OR (US); Evan Christopher Rege, Portland, OR (US); Shawn Leland Huff, Portland, OR (US)

(73) Assignee: GROWLERWERKS, INC., Portland, OR (US)

( * ) Notice: Subject to any disclaimer, the term of this patent is extended or adjusted under 35 U.S.C. 154(b) by 0 days.

(21) Appl. No.: 14/848,044

(22) Filed: Sep. 8, 2015

(65) Prior Publication Data

US 2016/0068380 A1 Mar. 10, 2016

Related U.S. Application Data

(60) Provisional application No. 62/047,594, filed on Sep. 8, 2014, provisional application No. 62/085,228, filed
(Continued)

(51) Int. Cl.
*B67D 7/56* (2010.01)
*G01F 23/02* (2006.01)
(Continued)

(52) U.S. Cl.
CPC ........... *B67D 1/0871* (2013.01); *B67D 1/0004* (2013.01); *B67D 1/0406* (2013.01); *B67D 1/0804* (2013.01);
(Continued)

(58) Field of Classification Search
CPC ... B67D 1/0871; B67D 1/0004; B67D 1/0406; B67D 1/0804; B67D 1/0418; B67D 1/0808; B67D 1/0884; B67D 1/125; B67D 1/1252; B67D 1/1466; B67D 2001/0824; B67D 2001/0825; B67D 2210/00104
(Continued)

(56) References Cited

U.S. PATENT DOCUMENTS

| 123,668 A | * | 2/1872 | Bingham | ............... B65D 83/40 222/153.02 |
| 160,511 A | * | 3/1875 | Desgeorges | ......... B67D 1/0871 220/23.83 |

(Continued)

OTHER PUBLICATIONS

"Innovation" Growler Werks [online], Sep. 17, 2015. Retrieved on Nov. 14, 2015. Retrieved from the Internet. <https://web.archive.org/web/20150917091038/http://www.growlerwerks.com/pages/innovation>.

(Continued)

*Primary Examiner* — Patrick M Buechner
(74) *Attorney, Agent, or Firm* — Marger Johnson

(57) ABSTRACT

A beverage dispenser includes a vessel, a dispensing tap, a dispenser assembly, and a dispensing tube. The vessel defines an internal volume, a lower opening, and an upper opening. The dispensing tube couples the dispensing tap to the dispenser assembly. The dispenser assembly includes a liquid level gauge structure (gauge structure), a riser tube, a lower housing, and an upper housing. The riser tube is positioned within a gauge structure and defines a riser volume. A gauge volume is defined between the gauge structure and the riser tube. The lower housing is configured such that the riser volume and the gauge volume are in fluid communication with the internal volume. The upper housing is configured such that the internal volume is in fluid communication with only the gauge volume and the riser tube is in fluid communication with a volume defined by the dispensing tube.

10 Claims, 21 Drawing Sheets

Related U.S. Application Data on Nov. 26, 2014, provisional application No. 62/146,858, filed on Apr. 13, 2015.

(51) Int. Cl.
| | | |
|---|---|---|
| *B67D 1/08* | (2006.01) | |
| *B67D 1/00* | (2006.01) | |
| *B67D 1/04* | (2006.01) | |
| *B67D 1/14* | (2006.01) | |
| *B67D 1/12* | (2006.01) | |

(52) U.S. Cl.
CPC ........... *B67D 1/0418* (2013.01); *B67D 1/0808* (2013.01); *B67D 1/0884* (2013.01); *B67D 1/125* (2013.01); *B67D 1/1252* (2013.01); *B67D 1/1466* (2013.01); *B67D 2001/0824* (2013.01); *B67D 2001/0825* (2013.01); *B67D 2210/00104* (2013.01)

(58) Field of Classification Search
USPC .................................................. 73/323, 325
See application file for complete search history.

(56) References Cited

U.S. PATENT DOCUMENTS

| | | | | | |
|---|---|---|---|---|---|
| 270,416 | A * | 1/1883 | Gnadinger, Jr. | ........ | G01F 23/02 73/323 |
| 2,554,100 | A * | 5/1951 | Facchini | ................ | G01F 23/02 73/323 |
| 2,696,738 | A * | 12/1954 | Lupfer | ................... | G01F 23/02 116/227 |
| 2,847,856 | A * | 8/1958 | Mahon | ................... | G01F 23/02 73/325 |
| 2,984,108 | A * | 5/1961 | Anderson | ............... | G01F 23/66 73/323 |
| 3,212,335 | A * | 10/1965 | Guiffre | ................ | B67D 1/0871 73/328 |
| 3,292,434 | A * | 12/1966 | McDaniel | ............... | G01F 23/02 374/E5.041 |
| 3,311,267 | A * | 3/1967 | Lee | ..................... | B67D 1/0871 116/227 |
| 3,455,163 | A * | 7/1969 | Lukas | .................... | G01F 23/02 374/E13.011 |
| 3,540,276 | A * | 11/1970 | Lyden | .................... | G01F 23/02 73/328 |
| 3,835,708 | A * | 9/1974 | Gruett | .................... | G01F 23/02 374/148 |
| 3,886,796 | A * | 6/1975 | Gruett | .................... | G01F 23/02 73/328 |
| 3,956,934 | A | 5/1976 | White | | |
| 4,050,305 | A * | 9/1977 | Evans | ....................... | G01F 1/22 73/272 R |
| 4,220,048 | A * | 9/1980 | Grepiotis | ................ | B67D 1/02 62/125 |
| 4,257,748 | A * | 3/1981 | Ives | ........................ | G01F 23/02 116/228 |
| 4,671,110 | A * | 6/1987 | de Kock | ................. | G01F 23/02 73/304 R |
| 4,987,777 | A * | 1/1991 | Bourret | ................... | G01F 23/02 116/227 |
| 5,323,653 | A * | 6/1994 | Gruett | .................... | G01K 13/02 374/E13.006 |
| 5,568,882 | A * | 10/1996 | Takacs | ................. | G01F 23/168 222/155 |
| 6,234,018 | B1 * | 5/2001 | Kelada | .................... | F16K 17/26 73/323 |
| 6,857,315 | B1 | 2/2005 | Mills et al. | | |
| 6,898,374 | B1 * | 5/2005 | Wen | ......................... | F23K 5/04 123/445 |
| 7,954,666 | B2 | 6/2011 | Webster et al. | | |
| 2002/0014118 | A1 * | 2/2002 | Wech | ...................... | G01F 23/02 73/323 |
| 2004/0083809 | A1 * | 5/2004 | Wech | ...................... | G01F 23/02 73/323 |
| 2009/0308898 | A1 | 12/2009 | Polano et al. | | |
| 2011/0036451 | A1 | 2/2011 | Maas et al. | | |
| 2012/0199682 | A1 | 8/2012 | Lee et al. | | |
| 2015/0336785 | A1 * | 11/2015 | Rege | .................... | B67D 1/0418 222/1 |

OTHER PUBLICATIONS

International Search Report and the Written Opinion, Jan. 21, 2016, 17 pages, International application No. PCT/US15/49005, Alexandria, Virginia.

\* cited by examiner

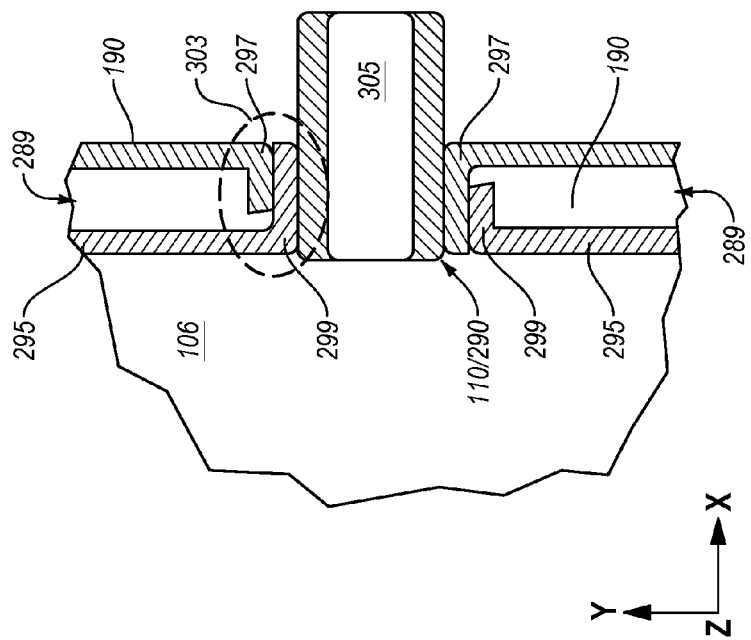
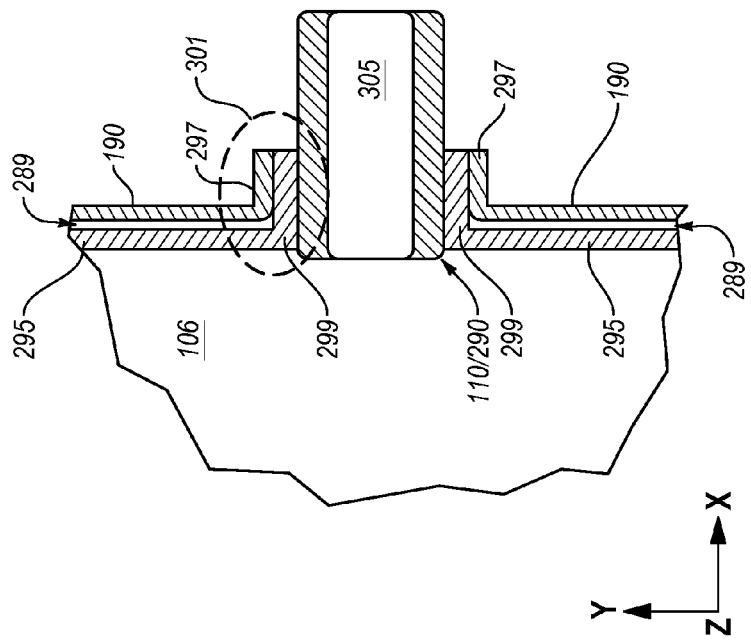
Fig. 3A
Fig. 3B

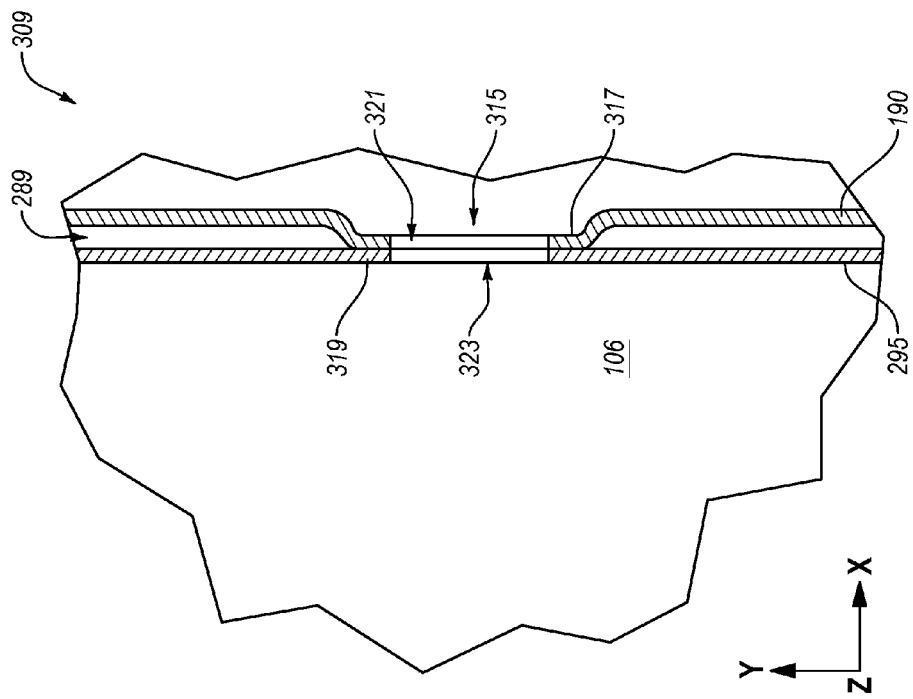

BEVERAGE DISPENSER HAVING LIQUID LEVEL GAUGE

RELATED APPLICATIONS

This patent application claims the benefit of and priority to U.S. Provisional Application Nos. 62/047,594 filed Sep. 8, 2014; 62/085,228 filed Nov. 26, 2014; and 62/146,858 filed Apr. 13, 2015. The foregoing applications are incorporated herein by reference in their entireties.

FIELD

The embodiments described herein are related to beverage dispensers.

BACKGROUND

A beverage such as beer, hard cider, and some wines may contain dissolved carbon dioxide and/or other gases. The dissolved gas gives the beverage a carbonated or bubbly quality. The dissolved gas may come out of solution, making the beverage flat. In particular, when exposed to atmospheric pressure, the beverage may become flat. When the beverage becomes flat, consumers are less likely to consume the beverage.

Additionally, a flavor of the beverage may benefit from limiting or eliminating exposure of the beverage to oxygen and heat. Exposure to oxygen may cause oxygenation processes to occur in the beverage, which may alter the flavor of the beverage and/or cause the beverage to become stale or spoil. For example, craft beer, which may have a rich flavor when produced, may adopt a cardboard-like flavor when exposed to oxygen.

Heat may similarly affect the flavor of beverages such as craft beers. For example, some consumers prefer craft beers at a particular temperature and may wish to maintain the particular temperature during transport and while consuming the craft beers.

The subject matter claimed herein is not limited to embodiments that solve any disadvantages or that operate only in environments such as those described above. Rather, this background is only provided to illustrate one example technology area where some embodiments described herein may be practiced.

SUMMARY

An example embodiment includes a beverage dispenser. The beverage dispenser includes a vessel, a dispensing tap, a dispenser assembly, and a dispensing tube. The vessel defines an internal volume, a lower opening, and an upper opening. The dispensing tube couples the dispensing tap to the dispenser assembly. The dispenser assembly includes a liquid level gauge structure, a riser tube, a lower housing, and an upper housing. The riser tube is positioned within a liquid level gauge structure. The riser tube defines a riser volume and a gauge volume is defined between the liquid level gauge structure and the riser tube. A portion of the lower housing penetrates the vessel at the lower opening. The lower housing is configured such that at the lower housing, the riser volume and the gauge volume are in fluid communication with the internal volume. A portion of the upper housing penetrates the vessel at the upper opening. The upper housing is configured such that at the upper housing, the internal volume is in fluid communication with only the gauge volume and the riser tube is in fluid communication with a volume defined by the dispensing tube.

Another example embodiment includes a method of manufacturing an opening of a vessel that includes a double-wall vacuum space. The method includes punching a first wall opening in a first wall of the vessel. The method includes defining an angled portion around a circumference of the first wall opening. The method includes punching a second wall opening in a second wall of the vessel. The method includes aligning the angled portion with a connection surface surrounding the second wall opening. The method includes joining the connection surface with the angled portion. The method includes sealing a vessel bottom to a lower edge of the first wall and to a lower edge of the second wall. The method includes evacuating a space between the first wall and the second wall.

Another example embodiment includes a beverage dispenser. The beverage dispenser includes a vessel that includes a double-wall vacuum space and at least one opening manufactured according to a method of manufacturing an opening. The method includes punching a first wall opening in a first wall of the vessel. The method includes defining an angled portion around a circumference of the first wall opening. The method includes punching a second wall opening in a second wall of the vessel. The method includes aligning the angled portion with a connection surface surrounding the second wall opening. The method includes joining the connection surface with the angled portion. The method includes sealing a vessel bottom to a lower edge of the first wall and to a lower edge of the second wall. The method includes evacuating a space between the first wall and the second wall.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which:

FIG. 3A illustrates an example interface that may be implemented in the dispenser assembly of FIGS. 2A-2C;

FIG. 3B illustrates another example interface that may be implemented in the dispenser assembly of FIGS. 2A-2C;

FIG. 3D illustrates an example interface that may be implemented in the dispenser assemblies of FIGS. 2A-2G;

DETAILED DESCRIPTION OF SOME EXAMPLE EMBODIMENTS

Some embodiments described herein are related to a beverage dispenser. More particularly, some embodiments relate to a portable dispenser configured to preserve quality of a beverage or a fluid stored in the beverage dispenser by applying a pressure to the beverage and limiting oxygen exposure.

An example dispenser includes a vessel, a regulator cap assembly, and a dispenser assembly. The regulator cap assembly seals the vessel and applies a gas pressure to a beverage in an internal volume defined by the vessel. The pressurized gas provides sufficient pressure to pressurize and dispense the beverage. The vessel may include a double-wall construction with a vacuum space defined between an interior wall and an exterior wall of the vessel. The vacuum space may insulate the beverage in the interior volume from an environment surrounding the beverage dispenser.

An upper opening and a lower opening may be defined in the vessel. In some embodiments, the openings include brazed interfaces or weld joints that are substantially airtight. The dispenser assembly includes an upper housing and a lower housing that penetrate the vessel at the upper opening and lower opening, respectively. The dispenser assembly includes a concentric-cylindrical construction that includes a liquid level gauge structure and a riser tube. The riser tube is positioned within a liquid level gauge structure. The riser tube defines a riser volume and a gauge volume is defined between the liquid level gauge structure and the riser tube. The lower housing is configured such that at the lower housing, the riser volume, and the gauge volume are in fluid communication with the internal volume. The upper housing is configured such that at the upper housing, the internal volume is in fluid communication with only the gauge volume and the riser tube is in fluid communication with a volume defined by the dispensing tube. These and other embodiments are further described with reference to the appended figures in which common item numbers indicate common structures unless otherwise indicated.

Figure 1A:
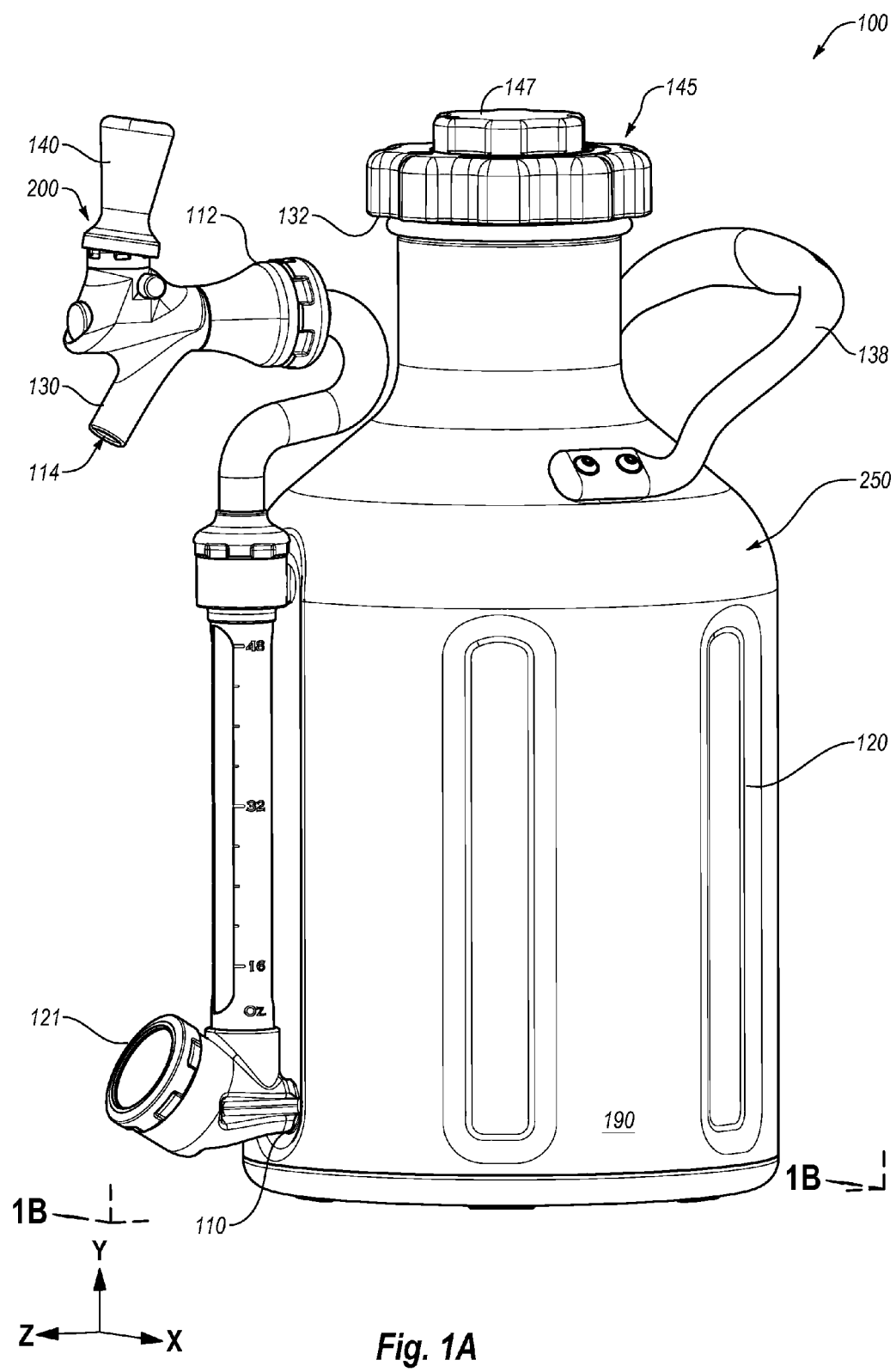
FIG. 1A illustrates an example beverage dispenser.
Figure 1B:
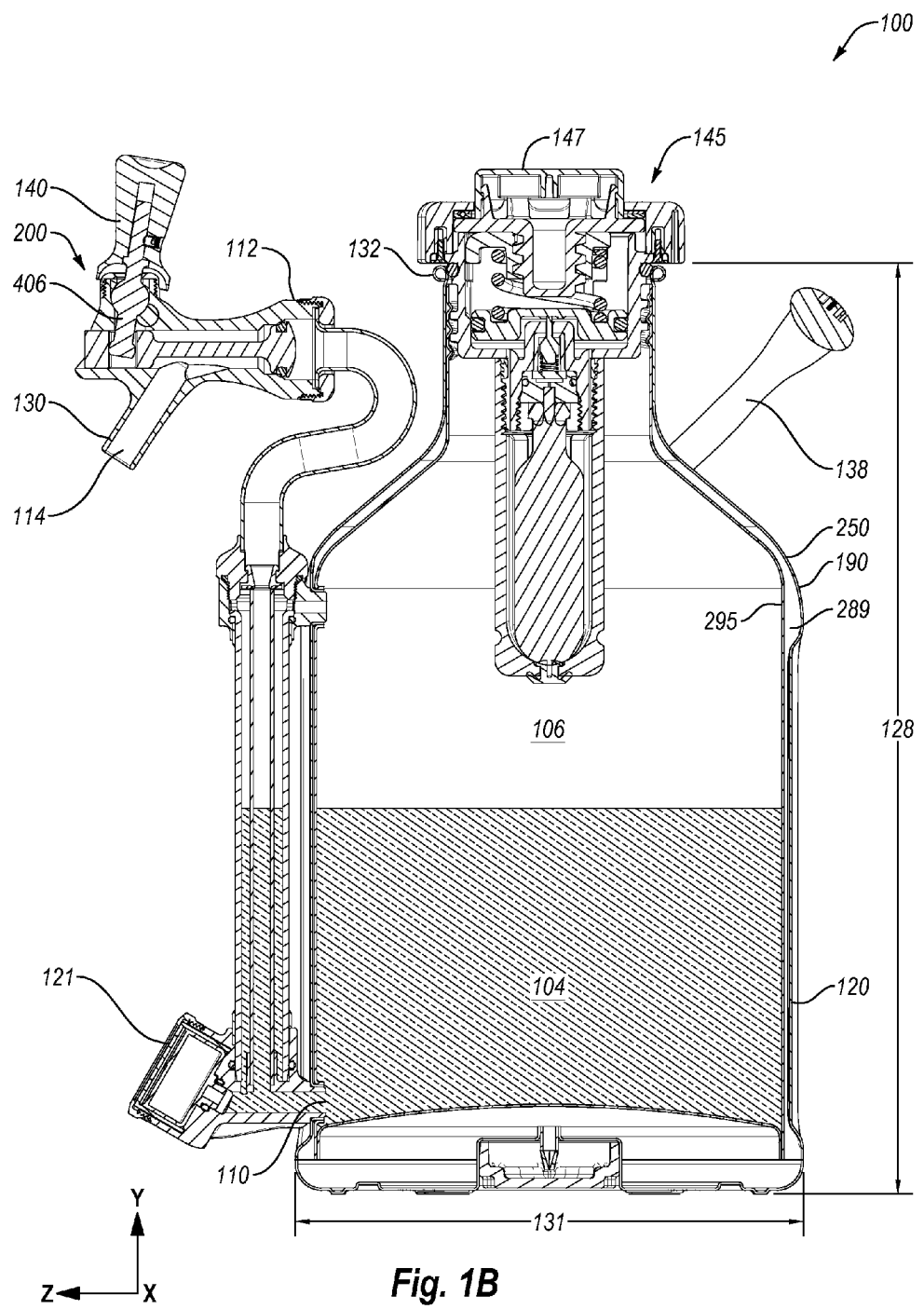
FIG. 1B illustrates another view of the beverage dispenser of FIG. 1A.

FIGS. 1A and 1B illustrate an example beverage dispenser 100. FIG. 1A depicts an exterior perspective view of the beverage dispenser 100 and FIG. 1B depicts a sectional view of the beverage dispenser 100. Generally, the beverage dispenser 100 is a portable beverage dispenser that may be used to store, preserve, transport, and dispense a beverage 104 (FIG. 1B only) retained in an internal volume 106 defined by a vessel 120.

The vessel 120 is configured to receive a regulator cap assembly 145. The regulator cap assembly 145 is configured to at least partially seal a mouth 132 of the vessel 120 and to regulate a pressure applied to the beverage 104. In particular, the regulator cap assembly 145 may apply a pressure to the beverage 104 that is selectable and adjustable based at least partially on a rotational position of a dial 147. The pressure applied to the beverage 104 by the regulator cap assembly 145 may preserve a freshness of the beverage 104 by reducing interaction between the beverage 104 and atmospheric air or oxygen. Additionally, the pressure applied to the beverage 104 may increase a period in which the beverage 104 maintains a gaseous solution (e.g., carbonation) and/or may force a portion of a gas into solution (e.g., carbonate) in the beverage 104. Additionally still, the pressure applied to the beverage 104 may also be used to dispense the beverage 104 from the beverage dispenser 100.

In some embodiments, the regulator cap assembly 145 is substantially similar to one or more embodiments discussed in co-pending U.S. application Ser. No. 14/720,356 filed May 22, 2015, which is incorporated herein by reference in its entirety.

The vessel 120 may be vacuum-insulated. The vessel 120 of FIGS. 1A and 1B may include a double-wall construction, which is best illustrated in FIG. 1B. The double-wall construction may define a vacuum space 289 between an interior wall 295 and an exterior wall 190 of the vessel 120. The vacuum space 289 may insulate the beverage 104 in the internal volume 106 from an environment surrounding the beverage dispenser 100.

In some embodiments, the vacuum space 289 may have a partial vacuum or an imperfect vacuum. The vacuum or partial vacuum may have a thermal resistance (R) value that is higher than some insulator materials. For example, the vacuum space may have an R value of about 5.25 square meters per kilowatt ($m^2$ K/W) to about 8.8 $m^2$ K/W, while a silica or a polyurethane may have an R value of about 1.1 $m^2$ K/W to about 1.76 $m^2$ K/W. The vessel 120 can be constructed of a metal or metal alloy that may comprise, for example, a stainless steel or an aluminum.

The internal volume 106 of the vessel 120 may be defined to include multiple volumes and multiple shapes. For example, the internal volume 106 may be about sixty-four volumetric ounces (oz.), 32 oz., 128 oz., 1 liter (L), 2 L, 10 L, for instance.

With reference to FIG. 1B, the vessel 120 may include a vessel height 128 of between about 150 millimeters (mm) and about 460 mm and a vessel diameter 131 between about 100 mm and about 460 mm. The vacuum space 289 or a total thickness defined to include the interior wall 295 and the exterior wall 190 of the vessel 120 may be between 1.5 mm and about 5.1 mm. The thickness of the interior wall 295 and/or the exterior wall 190 may be between about 0.8 mm and about 3.1 mm. For example, the example vessel 120 shown in FIGS. 1A and 1B includes a vessel height 128 of about 250 mm and vessel diameter 131 of about 125 mm.

In the vessel 120 of FIGS. 1A and 1B, a first portion of a threaded connection may be defined at the mouth 132 of the vessel 120. The regulator cap assembly 145 may include a second, complementary portion of the threaded connection. Accordingly, the regulator cap assembly 145 may be received by the vessel 120 by rotating the regulator cap assembly 145 relative to the vessel 120. Such rotation couples the regulator cap assembly 145 with the vessel 120. When received by the vessel 120, the regulator cap assembly 145 may apply the pressure to the beverage 104.

As mentioned above, the pressure applied to the beverage 104 may be used to dispense the beverage 104 from the beverage dispenser 100. For example, the pressure applied to the beverage 104 may be greater than a pressure in the environment surrounding the beverage dispenser 100. The pressure may force the beverage 104 into a dispenser assembly 200. Two embodiments of the dispenser assembly 200 are described in this disclosure. A first dispenser assembly 200A is described with reference to FIGS. 2A-2C. A second dispenser assembly 200B is described with reference to FIGS. 2D-2G. The first and second beverage assemblies 200A and 200B are referred to generally as the beverage assemblies 200.

The beverage assemblies 200 may be configured to transport the beverage 104 from the internal volume 106 of the vessel 120 to a dispensing tap 130. When a tap handle 140 of the dispensing tap 130 is actuated, the dispenser assembly 200 may be open to the pressure of the environment, and the beverage 104 may flow in a positive y-direction in the arbitrarily assigned coordinate system of FIGS. 1A-1B. The beverage 104 may then exit the dispenser assembly 200 via a tap exit 114.

The beverage 104 inside the vessel 120 may travel through a lower opening 110 defined in the vessel 120. At the lower opening 110, the dispenser assembly 200, or some portion thereof, penetrates and seals to the vessel 120 such that a volume defined by the dispenser assembly 200 is substantially continuous and fluidly coupled to the internal volume 106 defined by the vessel 120. The beverage 104 may enter the dispenser assembly 200 at the lower opening 110 and may then travel up (e.g., in a positive y-direction) the dispenser assembly 200 to a tap entry 112 of the dispensing tap 130. The fluid may then enter the dispensing tap 130.

The dispensing tap 130 may include a rocker valve 406 (shown in FIG. 1B and described elsewhere in this disclosure). The rocker valve 406 may be opened and shut in response to actuation of the tap handle 140. For instance, in response to a user actuating the tap handle 140 in a first direction (e.g., the z-direction), the beverage 104 moves past the rocker valve 406 and is discharged from a tap exit 114 of the dispensing tap 130. In response to the user actuating the tap handle 140 in a second direction (e.g., the negative z-direction), which may be substantially opposite the first direction, the beverage 104 may be contained between the rocker valve 406 and the tap entry 112. Some additional details of the dispenser assembly 200 are discussed elsewhere in this disclosure.

Additionally, beverage dispenser 100 of FIGS. 1A-1B may include a pressure gauge 121. The pressure gauge 121 may indicate a pressure in the internal volume 106 of the vessel 120. The pressure indicated by the pressure gauge 121 may correspond to the pressure applied by the regulator cap assembly 145.

In the depicted embodiment, the pressure gauge 121 is received by and in fluid communication with the dispenser assembly 200. In some embodiments, the pressure gauge 121 may be positioned on the vessel 120 or the regulator cap assembly 145 or may be omitted from the beverage dispenser 100, for instance.

The beverage dispenser 100 may include a temperature gauge (not shown). The temperature gauge may indicate a temperature of the beverage 104 in the internal volume 106 of the vessel 120. The temperature gauge may be in fluid communication with the internal volume 106 similar to the pressure gauge 121 in FIGS. 1A and 1B. Alternatively, the temperature gauge may be incorporated in the pressure gauge 121 (e.g., one gauge that indicates pressure and temperature), fit to the vessel 120, fit to the regulator cap assembly 145, or omitted.

The temperature and/or pressure of the beverage 104 may be important factors to the quality of the beverage 104. The user can monitor the pressure and the temperature of the beverage 104 using the pressure gauge 121 and/or the temperature gauge. For example, the user may be interested in the pressure after an initial rotation of the dial 147 (as described elsewhere in this disclosure). The pressure gauge 121 provides feedback to the user that can be used in conjunction with the dial 147 to accurately set a desired pressure applied to the beverage 104. The pressure gauge 121 can also be useful for monitoring the pressure of the vessel 120 when the beverage dispenser 100 is not refrigerated and the temperature of the beverage 104 accordingly increases. The user may not want the contents to become over-pressurized as a result of increased temperature and may choose to vent some or all of the pressure to maintain the pressure of the beverage 104 within a specific range, or below a specific maximum level.

Additionally or alternatively, the temperature gauge may provide the user thermal information for preserving and maintaining the quality of the beverage 104. For example, beer has a more desirable flavor when served at medium to cold liquid temperatures. An example preferred range may be between about 35 and about 45 degrees Fahrenheit.

The beverage dispenser 100 of FIGS. 1A and 1B may include a handle 138. The handle 138 can be mechanically attached to the vessel 120. The handle 138 may be mechanically coupled to the vessel 120 via fasteners as shown in FIGS. 1A and 1B or via band straps (not shown) that grip around the vessel 120. The handle 138 is configured to assist in pouring the beverage from the vessel 120 and carrying the vessel 120 and may act as a counter-balance to the dispenser assembly 200. The handle 138 may be rigid and generally extend from the vessel 120 in a positive y-direction as shown in FIGS. 1A and 1B.

In the embodiment of FIGS. 1A and 1B, the vessel 120 includes the dispenser assembly 200, the tap handle 140, and the dispensing tap 130. In some embodiments, the beverage dispenser 100 may not include one or more of the dispenser assembly 200, the tap handle 140, and the dispensing tap 130. Additionally, one or more of the dispenser assembly 200, the tap handle 140, and the dispensing tap 130 may be located, at least partially, within the internal volume 106. In these embodiments as well as that depicted in FIGS. 1A and 1B, the beverage 104 may be dispensed by reducing the pressure applied to the vessel 120 (e.g., rotating the dial 147 to prevent introduction of gas to the internal volume 106), removing the regulator cap assembly 145, and pouring the beverage 104 from the mouth 132 of the vessel 120. The regulator cap assembly 145 can be replaced onto the vessel 120 and the user can rotate the dial 147 to the desired position, causing the regulator cap assembly 145 to pressurize the remaining beverage 104 contained in the vessel 120.

The dispensing tap 130 may be configured to be operated using one hand, which may allow the user to hold a glass to receive the beverage 104 in the other hand. The dispensing tap 130 may also be oriented on the vessel 120 to allow the user to place the glass under the dispensing tap 130 at an angle less than about 90 degrees, which may minimize the formation of excessive foam. The user opens and closes the dispensing tap 130 by pulling the tap handle 140 forward (in the z-direction in FIG. 1B) and closes the dispensing tap 130 by pushing the tap handle 140 back to its starting, closed position. The tap handle 140 may also include a safety locking mechanism, which is discussed elsewhere in this disclosure, to prevent the tap handle 140 from moving to the open position inadvertently.

Figure 2A:
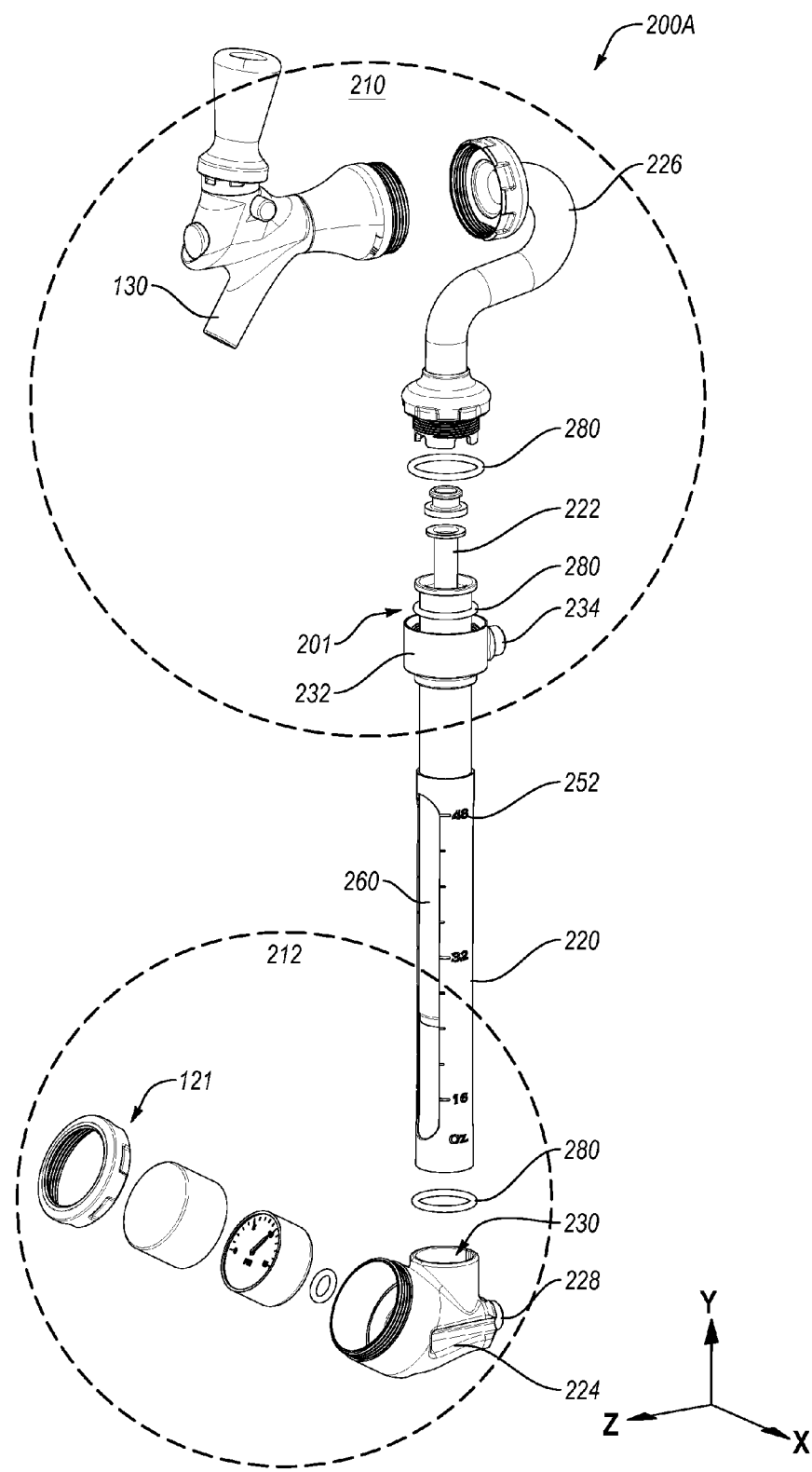
FIG. 2A illustrates an example dispenser assembly that may be implemented in the beverage dispenser of FIGS. 1A and 1B.
Figure 2B:
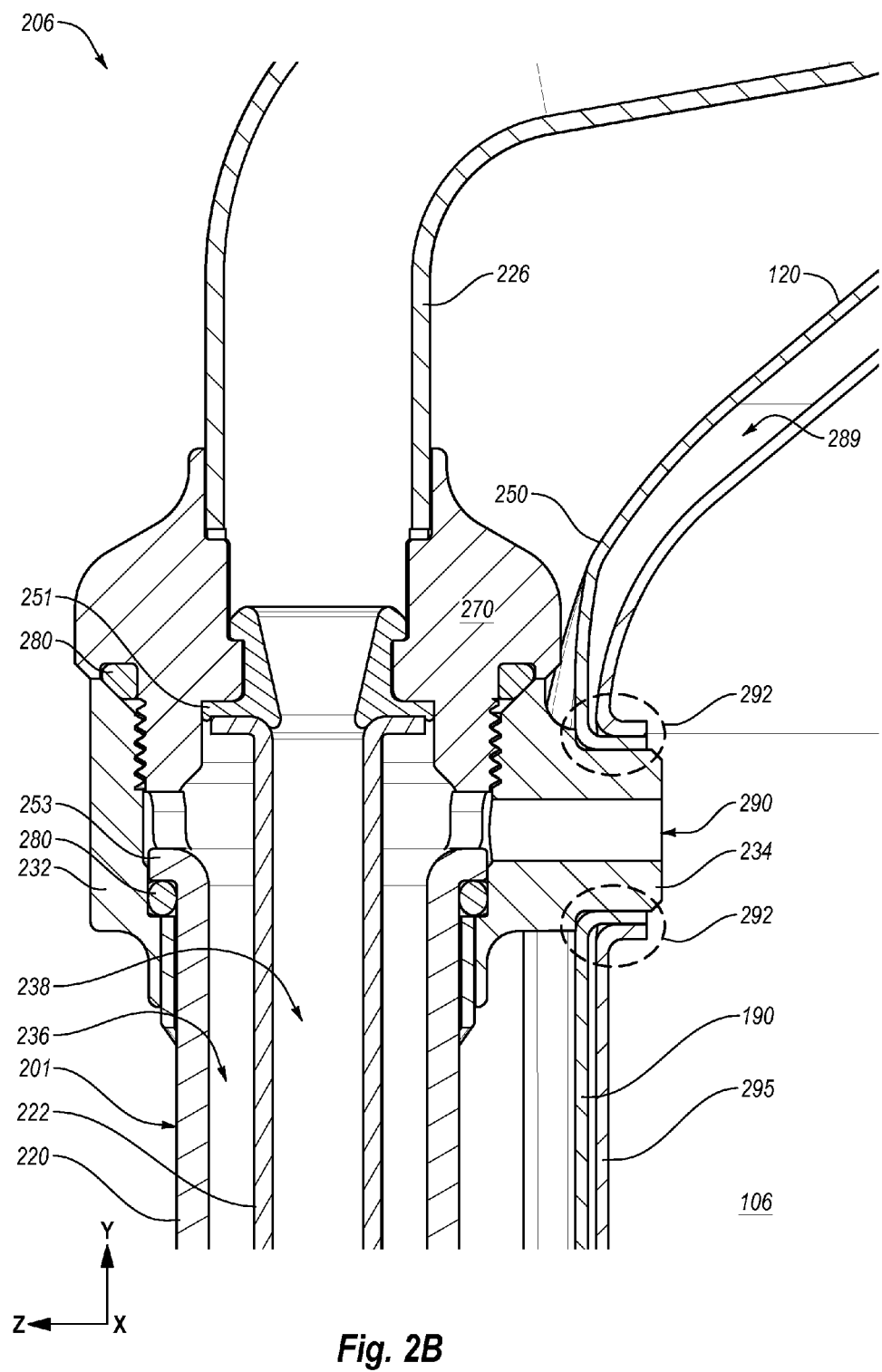
FIG. 2B illustrates a detailed view of a portion of the dispenser assembly of FIG. 2A.
Figure 2C:
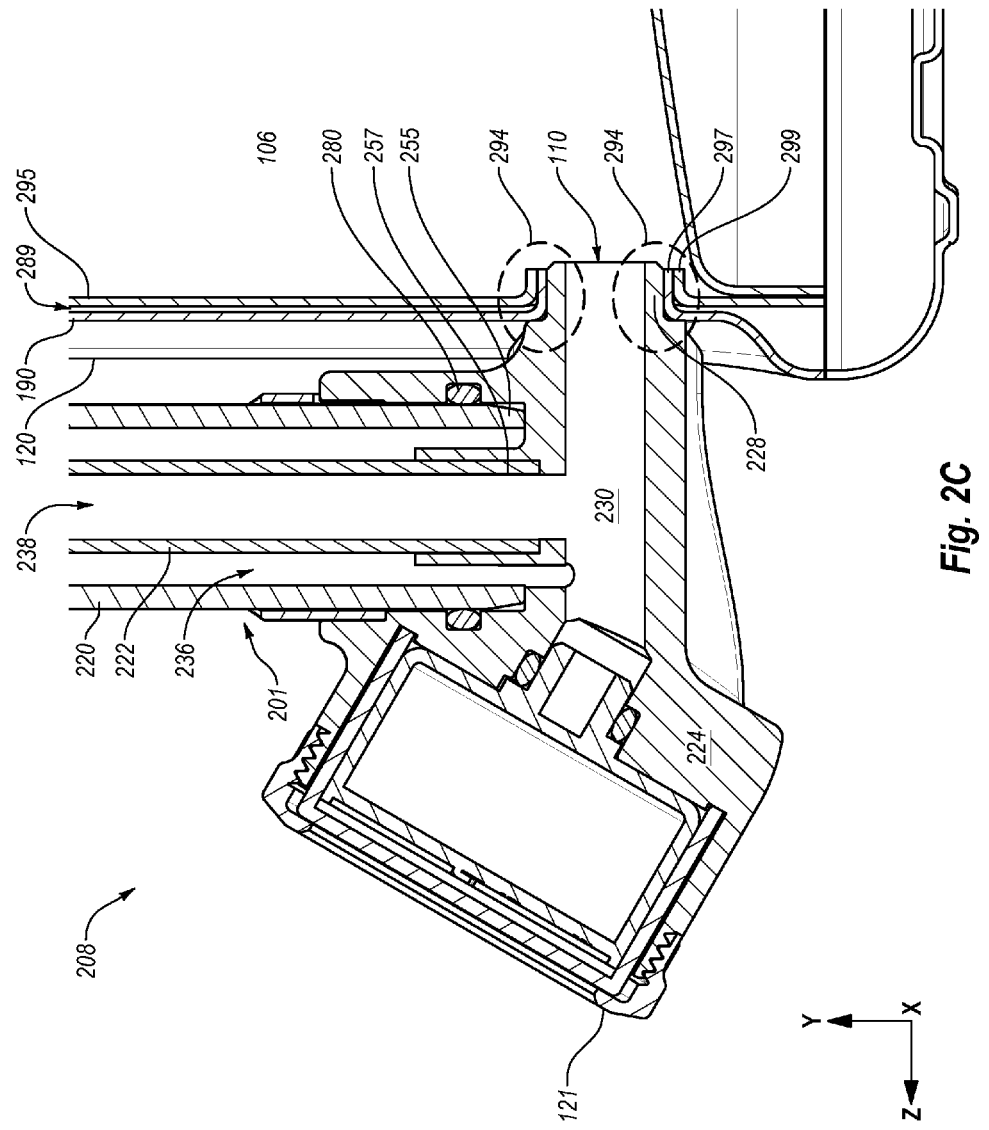
FIG. 2C illustrates another detailed view of another portion of the dispenser assembly of FIG. 2A.

FIGS. 2A-2C illustrate the first the dispenser assembly 200A. The first dispenser assembly 200A includes an example embodiment of dispenser assembly 200 of FIGS. 1A and 1B. FIG. 2A depicts a partially exploded view of the first dispenser assembly 200A. FIG. 2B depicts a sectional view of an upper assembly portion 206 of the first dispenser assembly 200A. FIG. 2C depicts a sectional view of a lower assembly portion 208 of the first dispenser assembly 200A. A first dashed circle 210 in FIG. 2A generally represents the upper assembly portion 206 and a second dashed circle 212 in FIG. 2A generally represents the lower assembly portion 208.

In FIGS. 2A-2C, the first dispenser assembly 200A may include a concentric-cylindrical construction, which is generally indicated at 201 in FIGS. 2A-2C. The concentric-cylindrical construction 201 spans from a lower housing 224 (FIGS. 2A and 2C only) through an upper housing 232 (FIGS. 2A and 2B only) to an upper tube 226 (FIGS. 2A and 2B only).

The lower housing 224 of FIG. 2C includes a lower port 228 (FIG. 2C only) that is configured to penetrate the vessel 120 at the lower opening 110. The lower port 228 connects to a lower volume 230 defined by the lower housing 224 such that the internal volume 106 is in fluid communication with the lower volume 230.

Referring to FIGS. 2A-2C, an outer cylinder of the first dispenser assembly 200A may include a liquid level gauge structure 220. A riser tube 222 is positioned within the liquid level gauge structure 220. The riser tube 222 is substantially concentric with the liquid level gauge structure 220. Between the liquid level gauge structure 220 and the riser tube 222 is a gauge volume 236. Within the riser tube 222 is a riser volume 238. The liquid level gauge structure 220 generally includes the entire cylindrical structure (e.g., 360 degrees). Within the liquid level gauge structure 220 is a viewing window 260 (FIG. 2A only). The viewing window 260 is transparent or substantially transparent such that a beverage within the gauge volume 236 may be seen from an exterior of the liquid level gauge structure 220. The lower volume 230 connects to both the gauge volume 236 and to the riser volume 238. Accordingly, the internal volume 106 is also in fluid communication with the gauge volume 236 and the riser volume 238.

With reference to FIGS. 2A and 2B, the upper housing 232 includes an upper port 234. The upper port 234 is configured to penetrate the vessel 120 at an upper opening 290 (FIG. 2B only). At the upper housing 232, the upper port 234 connects to the gauge volume 236, but not to the riser volume 238. Additionally, the upper tube 226 is coupled to the riser tube 222 but is sealed from the gauge volume 236. The upper tube 226 then connects to the dispensing tap 130 (FIG. 2A only).

Accordingly, a beverage is introduced into the gauge volume 236 via the lower port 228 and the lower volume 230. The gauge volume 236 is exposed to a counter pressure of the internal volume 106 by the upper port 234. The counter pressure may be the pressure in a portion of the internal volume 106 not occupied by the beverage. Thus, the beverage fills the gauge volume 236 to a height that is substantially equal to a height of the beverage inside the internal volume 106. Additionally, the beverage in the gauge volume 236 is not exposed to atmospheric pressure when the rocker valve 406 of the dispensing tap 130 is actuated.

The riser tube 222 connects on its upper end to the upper tube 226 which connects to the dispensing tap 130. Thus, the riser volume 238 is not exposed to the counter pressure of the internal volume 106. Accordingly, the beverage may enter the riser volume 238 at the lower volume 230 and fill the riser volume 238, some portion of the upper tube 226, and, depending on a pressure in the internal volume 106, some portion of the dispensing tap 130. When the rocker valve 406 of the dispensing tap 130 is actuated, the beverage in the riser volume 238, the upper tube 226, and/or the dispensing tap 130 is exposed to atmospheric pressure. The exposure to the atmospheric pressure causes the beverage to be dispensed from the dispensing tap 130 (assuming the pressure in the vessel 120 is greater than atmospheric pressure).

Actuation of the rocker valve does not expose the riser volume 238 to the internal volume 106. Additionally, actuation of the rocker valve 406 does not expose the gauge volume 236 to atmospheric pressure. Thus, the level in the gauge volume 236 accurately reflects levels in the vessel 120 while the fluid is being dispensed.

Moreover, with reference to FIGS. 1B and 2A-2C, the regulator cap assembly 145 may be configured to maintain the pressure in the internal volume 106. For instance, when the beverage 104 is dispensed, a pressure in the internal volume 106 may drop. In response, the regulator cap assembly 145 may release a compressed gas to the internal volume 106, which may re-establish the pressure prior to the beverage 104 being dispensed. The compressed gas that is released to the internal volume 106 provides the counter pressure in the gauge volume 236, which affects the level of the beverage 104 such that the level in the gauge volume 236 is substantially similar to the level of the beverage 104 in the internal volume 106.

In the embodiment of FIGS. 2A-2C, the upper port 234 penetrates the vessel 120 at a vessel shoulder 250. The vessel shoulder 250 is also labeled in of FIG. 1A. The vessel shoulder 250 may not be at a maximum fill height of the vessel 120. Accordingly, the liquid level gauge structure 220 may only indicate a fluid level below the vessel shoulder 250. In some other embodiments, the upper port 234 may penetrate the vessel 120 above (e.g., having a larger y coordinate) the vessel shoulder 250.

Additionally, as best depicted in FIG. 2A, the liquid level gauge structure 220 includes graduations 252. The graduations 252 may correspond to a unit of measure such as liters, fluid ounces, pints, glasses, another suitable volumetric unit, or some combination thereof. For example, in some embodiments, the graduations 252 include fluid ounces on one side of the viewing window 260 and a corresponding number of pints represented by pint glasses on the other side of the viewing window 260.

The first dispenser assembly 200A of FIGS. 2A-2C includes a configuration that enables simple disassembly for cleaning. In particular, the first dispenser assembly 200A may enable a user to disassemble the vessel 120 and/or the first dispenser assembly 200A such that one or more of the components (e.g., 228, 230, 224, 222, and 234) may be cleaned.

With reference to FIGS. 2B and 2C, the first dispenser assembly 200A may include a cinch nut 270 (FIG. 2B only). The cinch nut 270 may be threaded or otherwise attached to the upper housing 232. The cinch nut 270 may be configured to be a single fastener that maintains the first dispenser assembly 200A in an assembled configuration (as depicted in FIGS. 1A, 1B, and 2B).

For example, a second end 257 of the riser tube 222 and a second end 255 of the liquid level gauge structure 220 are secured to the vessel 120 by the lower housing 224. The second end 257 of the riser tube 222 and the second end 255 of the liquid level gauge structure 220 may be cylindrical such that the second ends 255 and 257 may be secured in the lower housing 224 by moving the riser tube 222 and the liquid level gauge structure 220 in the negative y direction. Additionally, a first end 251 of the riser tube 222 and a first end 253 of the liquid level gauge structure 220 may be secured to the vessel 120 by the upper housing 232. The first ends 251 and 253 may have flared or angled portions that the cinch nut 270 presses against as the cinch nut 270 is tightened into the upper housing 232. Accordingly, when cinch nut 270 is removed, the riser tube 222 and the liquid level gauge structure 220 may be moved in the positive y-direction to disassemble the first dispenser assembly 200A.

Additionally, by removing the cinch nut 270, the upper tube 226 and the dispensing tap 130 may be removed from the upper housing 232. The riser tube 222, the liquid level gauge structure 220, and one or more O-rings 280 may be removed from the first dispenser assembly 200A. With these components removed, they may be cleaned. Additionally, with these components removed, the lower volume 230, the vessel 120, and the ports 234 and 228 may be cleaned. To reassemble the first dispenser assembly 200A, each of the components may be repositioned, and the cinch nut 270 may be fastened to the upper housing 232.

In FIGS. 2B and 2C, the upper opening 290 and the lower opening 110 are depicted, respectively. The upper opening 290 and the lower opening 110 (collectively, the openings 110/290) may be defined in the vessel 120 via one or more manufacturing processes. The upper port 234 and/or the lower port 228 may be attached to the openings 110/290, via welding, an adhesive, a threaded attachment, a press fit, or any other suitable mechanism or process. In some embodiments, the upper port 234 and/or the lower port 228 may be brazed to a braze interface 292 or 294 of the openings 110/290. For example, the upper opening 290 may be formed (as described below) and the upper port 234 may be attached to the vessel 120 via the braze interface 292. In particular, the openings 110/290 may be formed using a brazed interface between the exterior wall 190 and the interior wall 295. For each of the openings 110/290, the exterior wall 190 includes an angled portion 297 (labeled in FIG. 2C only). Similarly, for each of the openings 110/290, the interior wall 295 includes an angled portion 299 (labeled in FIG. 2C only). The angled portions 297 and 299 may extend around a perimeter or a circumference of the openings 110/290. A brazed gap may be defined between the angled portions 297 and 299. The brazed gap may be defined to receive an appropriate amount of braze to seal the interior wall 295 to the exterior wall 190 at the openings 110/290.

Prior to manufacturing the openings 110/290, braze may be added to one or both of the interior wall 295 and the exterior wall 190. The angled portions 297 and 299 may be aligned such that angled portions 297 of the interior wall 295 contact the angled portions 299 of the exterior wall 190. For example, the interior wall 295 may be placed within the exterior wall 190, and the angled portions 297 and 299 may be aligned when the interior wall 295 is centered in the exterior wall 190. The interior wall 295 and the exterior wall 190 may then be heated, which causes the braze to mate the exterior wall 190 with the interior wall 295 at the angled portions 297 and 299. A vacuum can then be pulled to create the vacuum space 289 between the exterior wall 190 and the interior wall 295.

In FIGS. 2A and 2B, the angled portions 297 and 299 are oriented in the negative z-direction, which is substantially towards the internal volume 106. In some embodiments, the angled portions 297 and 299 may be oriented in the z-direction. For example, FIG. 3A depicts a sectional view of an example brazed interface 301 in which the angled portions 297 and 299 are oriented in the x-direction, which in FIG. 3A is away from the internal volume 106. Additionally, FIG. 3B depicts a sectional view of another example brazed interface 303 in which one of the angled portions 299 is oriented in the x-direction, which is away from the internal volume 106; and the other of the angled portions 297 is oriented in the negative x-direction, which is towards the internal volume 106. With reference to FIGS. 3A and 3B, the angled portions 297 and 299 may extend around the circumference of the openings 110/290. As described elsewhere in this disclosure, a brazed gap may be defined between the angled portions 297 and 299, which may receive an appropriate amount of braze to seal the interior wall 295 to the exterior wall 190 at the openings 110/290. The angled portions 297 and 299 may be aligned and may then be heated, which causes the braze to mate the exterior wall 190 with the interior wall 295. A vacuum can then be pulled to create a vacuum space 289 between the exterior wall 190 and the interior wall 295.

In some embodiments, a heat sink 305 (FIGS. 3A and 3B only) may be positioned in the openings 110/290. The heat sink 305 may be configured to draw heat from the brazed interfaces 301, 303, 294, or 292. In addition, the heat sink 305 may be configured to support the angled portions 297 and 299 during at least a portion of a manufacturing process. Additional brazed interfaces may be implemented along a circumferential surface of the openings 110/290 to connect the ports 234 and 228 to the vessel 120. Alternatively, the ports 234 and 228 may be attached to the openings 110/290 by another suitable mechanism.

Figure 2D:
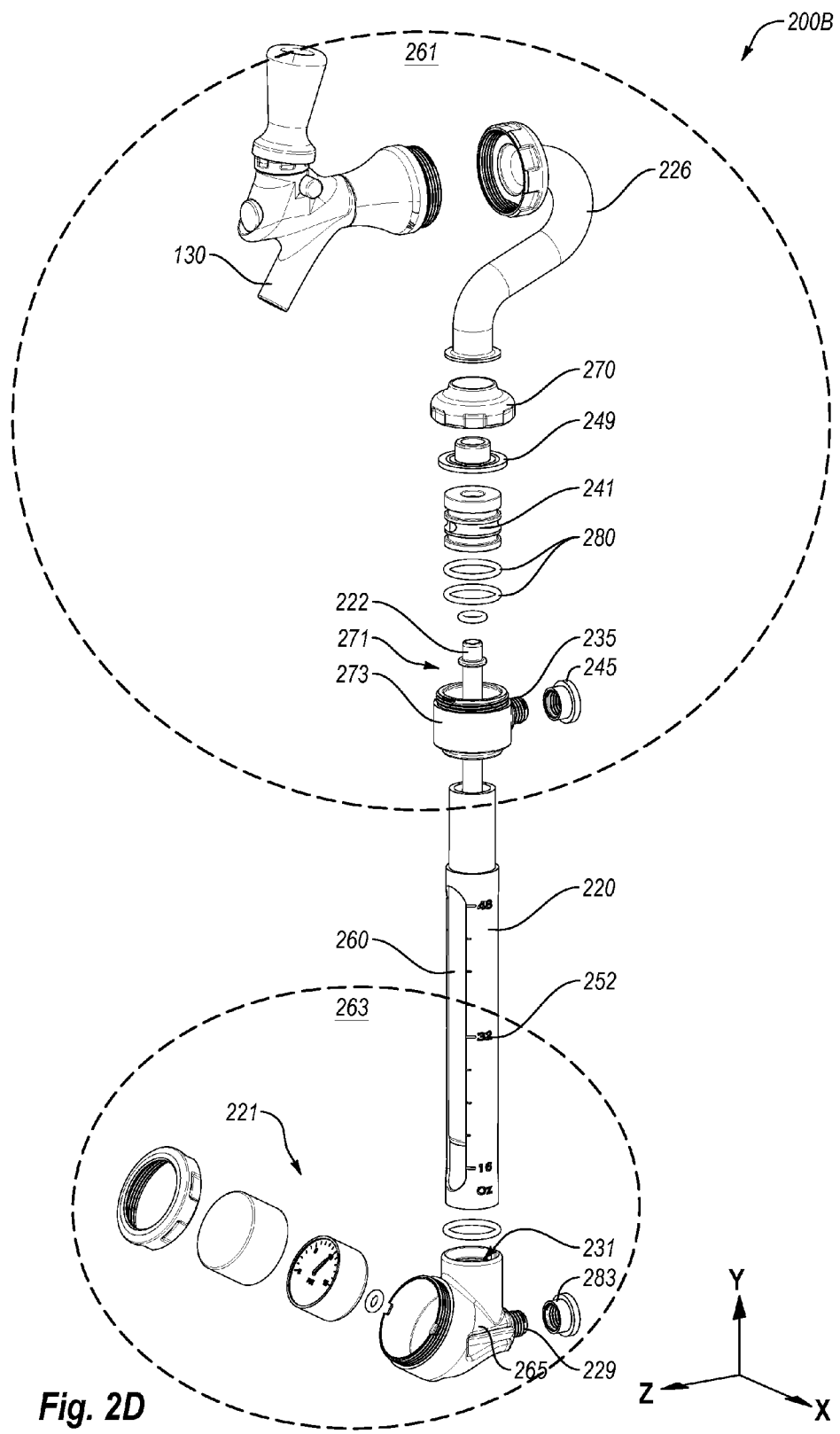
FIG. 2D illustrates another example dispenser assembly that may be implemented in the beverage dispenser of FIGS. 1A and 1B.
Figure 2E:
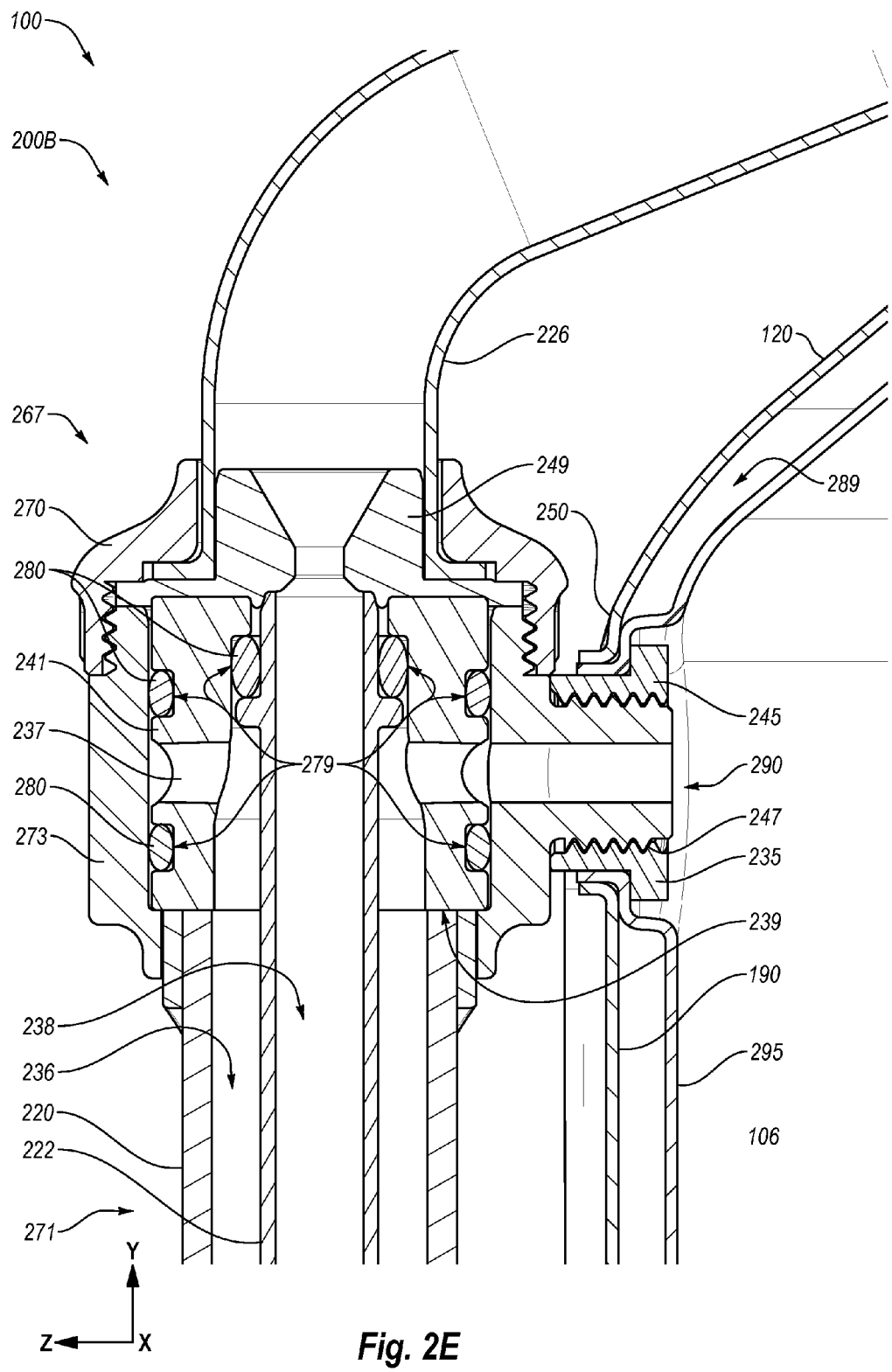
FIG. 2E illustrates a detailed view of a portion of the dispenser assembly of FIG. 2D.
Figure 2F:
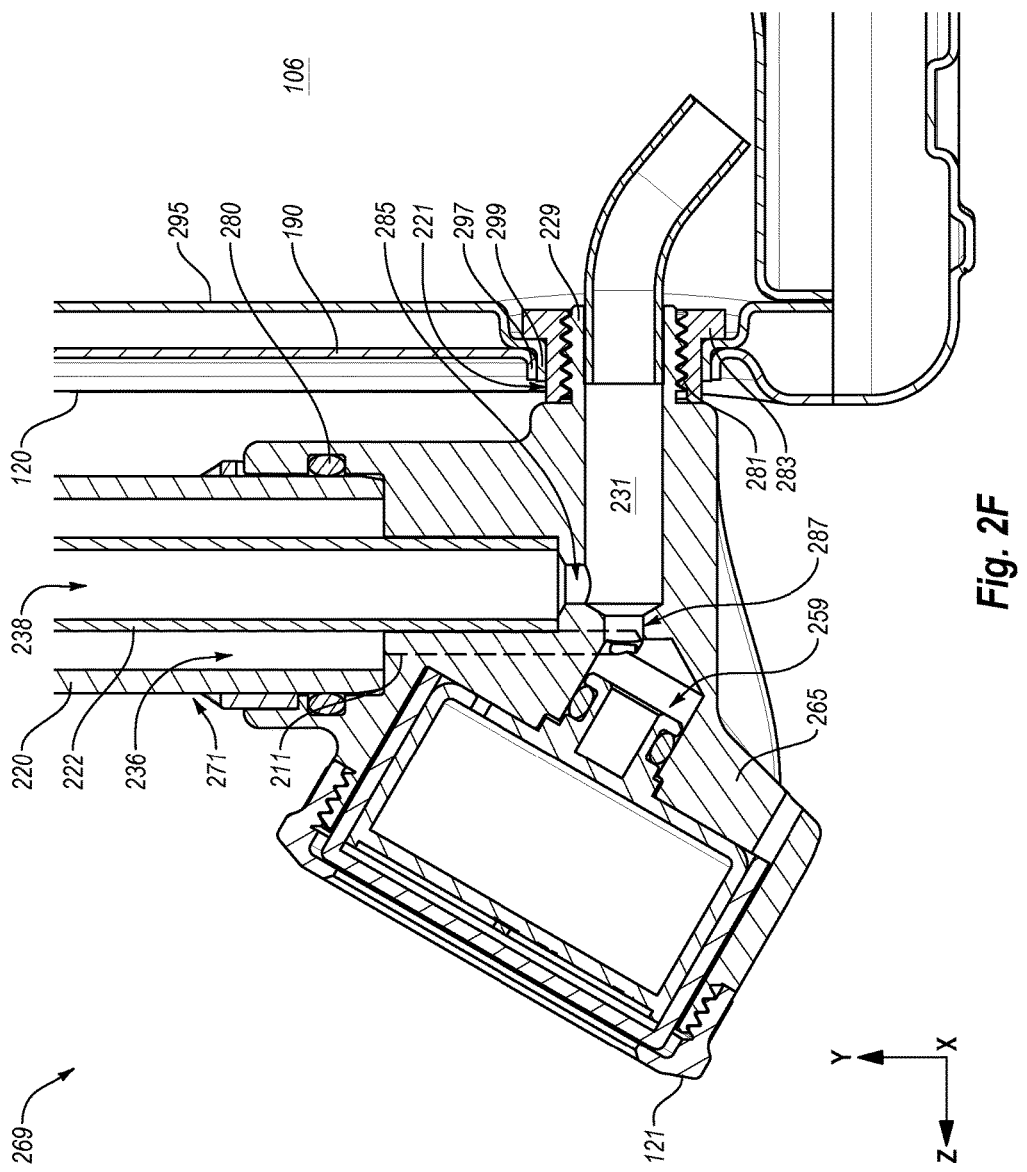
FIG. 2F illustrates a detailed view of another portion of the dispenser assembly of FIG. 2D.
Figure 2G:
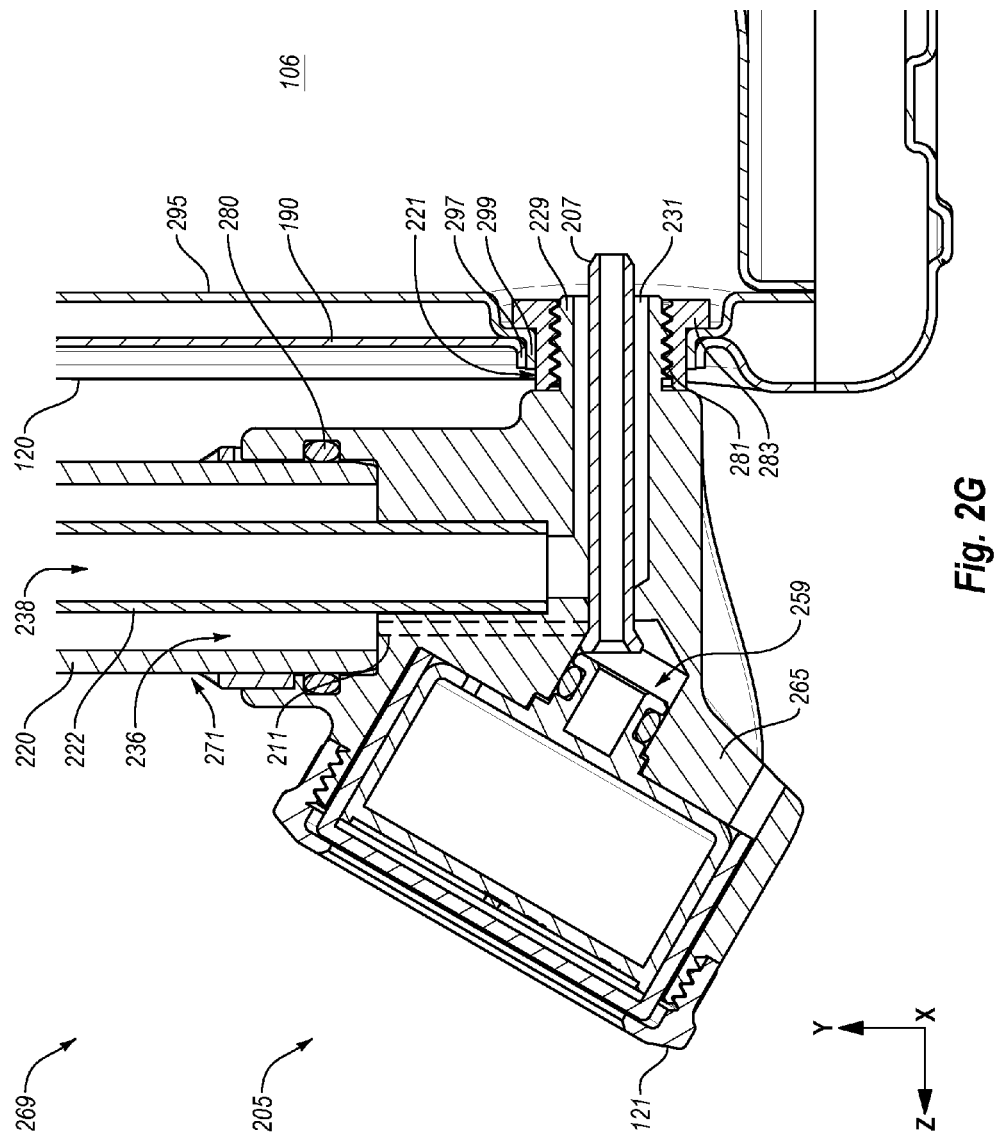
FIG. 2G illustrates a detailed view of another portion of the dispenser assembly of FIG. 2D.

FIGS. 2D-2G illustrate the second dispenser assembly 200B that may be implemented as the dispenser assembly 200 of FIGS. 1A and 1B. FIG. 2D depicts a partially exploded view of the second dispenser assembly 200B. FIG. 2E depicts a sectional view of an upper assembly portion 267 of the second dispenser assembly 200B. FIG. 2F depicts a sectional view of a lower assembly portion 269 of the second dispenser assembly 200B. FIG. 2G depicts a sectional view of another embodiment of the lower assembly portion 269 of the second dispenser assembly 200B. A first dashed circle 261 in FIG. 2D generally represents the upper assembly portion 267 and a second dashed circle 263 in FIG. 2D generally represents the lower assembly portion 269.

In FIGS. 2D-2G, the second dispenser assembly 200B may include a concentric-cylindrical construction 271. The concentric-cylindrical construction 271 is similar to the concentric-cylindrical construction 201 discussed with reference to FIGS. 2A-2C. The concentric-cylindrical construction 271 in the second dispenser assembly 200B spans from a lower vented housing 265 (FIGS. 2D, 2F, and 2G only) through a shuttle upper housing 273 (FIGS. 2D and 2E only) to the upper tube 226 (FIGS. 2D and 2E only).

Beginning with the lower vented housing 265 in FIG. 2F, the lower vented housing 265 includes a lower port 229 (FIGS. 2D and 2F only). The lower port 229 is configured to penetrate the vessel 120 at the lower opening 110. The lower port 229 connects to a lower volume 231 defined by the lower vented housing 265 such that the internal volume 106 is in fluid communication with the lower volume 231 defined by the lower vented housing 265. In the depicted embodiment, the lower port 229 may include a threaded connection 281. The threaded connection 281 may be configured to attach via a threaded interface to a lower wall stud 283 that is positioned in the lower opening 110.

As discussed above with reference to the first dispenser assembly 200A, an outer cylinder of the second dispenser assembly 200B may include the liquid level gauge structure 220. The riser tube 222 is positioned within the liquid level gauge structure 220 and is substantially concentric with the liquid level gauge structure 220. Between the liquid level gauge structure 220 and the riser tube 222 is the gauge volume 236. Within the riser tube 222 is the riser volume 238. The liquid level gauge structure 220 generally includes the entire cylindrical structure (e.g., 360 degrees). Within the liquid level gauge structure 220 is the viewing window 260 (FIG. 2D only).

In the embodiment of FIGS. 2D-2G, the liquid level gauge structure 220 may include a shorter length than that of the liquid level gauge structure 220 of the first dispenser assembly 200A. For example, the liquid level gauge structure 220 may not extend as far in a negative y-direction into the lower vented housing 265.

In addition, with particular reference to FIGS. 2D and 2F, the lower volume 231 may include restrictions 285 and 287. A first restriction 285 is between the lower volume 231 and the riser volume 238. A second restriction 287 is between the lower volume 231 and a pressure gauge volume 259 into which the pressure gauge 121 or another gauge is positioned. In addition, the lower vented housing 265 may define a gauge volume channel 211 between the pressure gauge volume 259 and the gauge volume 236.

Accordingly, a beverage (e.g., 104 of FIG. 1B) may enter and exit the riser volume 238 via the lower volume 231 and the first restriction 285. For example, as the beverage is dispensed from the beverage dispenser 100, the beverage 104 may travel from the internal volume 106 to the riser volume 238 via the lower volume 231 and the first restriction 285.

In addition, the beverage may enter and exit the gauge volume 236 via the lower volume 231, the second restriction 287, and the gauge volume channel 211. Inclusion of the restrictions 285 and 287 along with the gauge volume channel 211 controls, at least partially, rates in which the beverage enters and exits the gauge volume 236 and the riser volume 238. Moreover, the restrictions 285 and 287 and the gauge volume channel 211 may reduce the beverage being drawn from the gauge volume 236 to the riser volume 238 as the beverage is dispensed from a dispensing tap (e.g., the dispensing tap 130) via the riser volume 238.

With reference to FIGS. 2D and 2E, the shuttle upper housing 273 includes an upper port 235. The upper port 235 is configured to penetrate the vessel 120 at the upper opening 290 (FIG. 2E only). At the shuttle upper housing 273, the upper port 235 connects to the gauge volume 236, but not to the riser volume 238. Additionally, the upper tube 226 is coupled to the riser tube 222 via a carbonation orifice 249, but is sealed from the gauge volume 236. The upper tube 226 then connects to the dispensing tap 130 (FIG. 2D only).

Accordingly, a beverage is introduced into the gauge volume 236 via the lower volume 231, the second restriction 287, and the gauge volume channel 211. The gauge volume 236 is exposed to a counter pressure of the internal volume 106 by the upper port 235. The counter pressure may be the pressure in a portion of the internal volume 106 not occupied by the beverage. Thus, the beverage fills the gauge volume 236 to a height that is substantially equal to a height of the beverage inside the internal volume 106. Additionally, the beverage in the gauge volume 236 is not exposed to atmospheric pressure when the rocker valve 406 of the dispensing tap 130 is actuated.

The riser tube 222 connects on its upper end to the upper tube 226 which connects to the dispensing tap 130 via the carbonation orifice 249. Thus, the riser volume 238 is not exposed to the counter pressure of the internal volume 106. Accordingly, the beverage may enter the riser volume 238 via the lower volume 231 and the first restriction 285 and fill the riser volume 238, some portion of the upper tube 226, and, depending on a pressure in the internal volume 106, some portion of the dispensing tap 130. When the rocker valve 406 of the dispensing tap 130 is actuated, the beverage in the riser volume 238, the upper tube 226, and/or the dispensing tap 130 is exposed to atmospheric pressure. The exposure to the atmospheric pressure causes the beverage to be dispensed from the dispensing tap 130 (assuming the pressure in the vessel 120 is greater than atmospheric pressure).

Actuation of the rocker valve 406 does not expose the riser volume 238 to the internal volume 106. Additionally, actuation of the rocker valve 406 does not expose the gauge volume 236 to atmospheric pressure. Thus, the level in the gauge volume 236 accurately reflects levels in the vessel 120 while the beverage is being dispensed.

FIG. 2G depicts another example of the lower assembly portion 269. In the embodiment of FIG. 2G, a pitot lower assembly 205 is depicted. In the pitot lower assembly 205 a pitot 207 is included in the lower volume 231. The pitot 207 fluidly couples the internal volume 106 and the pressure gauge volume 259. A beverage (e.g., 104 of FIG. 1B) may accordingly pass from the internal volume 106 through the pitot 207 to the pressure gauge volume 259. From the pressure gauge volume 259, the beverage may enter the gauge volume 236 via the gauge volume channel 211.

A volume is defined between the lower vented housing 265 and the pitot 207. The volume defined between the lower vented housing 265 and the pitot 207 is referred to in this disclosure as an outer lower housing volume. The outer lower housing volume includes a portion of the lower volume 231 not taken up by the pitot 207. The outer lower housing volume fluidly couples the riser volume 238 to the internal volume 106. However, the pitot 207 prevents or substantially prevents fluid communication between the outer lower housing volume and the pressure gauge volume 259. Accordingly, the beverage may enter and exit the riser volume 238 via the outer lower housing volume. While entering and exiting the riser volume 238, the beverage does not enter the pressure gauge volume 236 and thus does not enter the gauge volume 236.

For example, as the beverage is dispensed from the beverage dispenser 100, the beverage 104 may travel from the internal volume 106 to the riser volume 238 via the outer lower housing volume. In addition, the beverage may enter and exit the gauge volume 236 via the pitot 207 and the gauge volume channel 211. Inclusion of the pitot 207 prevents, at least partially, the beverage entering and exiting the riser volume 238 from mixing with the beverage entering and exiting the gauge volume 236. The pitot 207 may reduce the beverage being drawn from the gauge volume 236 to the riser volume 238 as the beverage is dispensed from a dispensing tap (e.g., the dispensing tap 130) via the riser volume 238.

As described above with reference to FIGS. 2D and 2E, the shuttle upper housing 273 includes the upper port 235 configured to penetrate the vessel 120 at the upper opening 290 (FIG. 2E only). At the shuttle upper housing 273, the upper port 235 connects to the gauge volume 236, but not to the riser volume 238. Additionally, the upper tube 226 is coupled to the riser tube 222 via a carbonation orifice 249, but is sealed from the gauge volume 236. The upper tube 226 then connects to the dispensing tap 130 (FIG. 2D only).

Accordingly, a beverage is introduced into the gauge volume 236 via the pitot 207 and the gauge volume channel 211. The gauge volume 236 is exposed to a counter pressure of the internal volume 106 by the upper port 235. The counter pressure may be the pressure in a portion of the internal volume 106 not occupied by the beverage. Thus, the beverage fills the gauge volume 236 to a height that is substantially equal to a height of the beverage inside the internal volume 106. Additionally, the beverage in the gauge volume 236 is not exposed to atmospheric pressure when the rocker valve 406 of the dispensing tap 130 is actuated.

The riser tube 222 connects on its upper end to the upper tube 226 which connects to the dispensing tap 130 via the carbonation orifice 249. Thus, the riser volume 238 is not exposed to the counter pressure of the internal volume 106. Accordingly, the beverage may enter the riser volume 238 outer lower housing volume and fill the riser volume 238, some portion of the upper tube 226, and, depending on a pressure in the internal volume 106, some portion of the dispensing tap 130. When the rocker valve 406 of the dispensing tap 130 is actuated, the beverage in the riser volume 238, the upper tube 226, and/or the dispensing tap 130 is exposed to atmospheric pressure. The exposure to the atmospheric pressure causes the beverage to be dispensed from the dispensing tap 130 (assuming the pressure in the vessel 120 is greater than atmospheric pressure).

Actuation of the rocker valve 406 does not expose the riser volume 238 to the internal volume 106. Additionally, actuation of the rocker valve 406 does not expose the gauge volume 236 to atmospheric pressure. Thus, the level in the gauge volume 236 accurately reflects levels in the vessel 120 while the beverage is being dispensed.

The pitot 207 may be configured to be removably assembled with the lower vented housing 265. For example, with the pressure gauge 121 removed, the pitot 207 may be placed in the lower vented housing 265 by orienting the pitot 207 as depicted in FIG. 2G and moving the pitot 207 in substantially the negative z-direction. The pressure gauge 121 may then be assembled with the lower vented housing 265, which may retain the pitot 207 in the lower vented housing 265. To clean the pitot 207, the pressure gauge 121 may be removed and the pitot 207 may be moved in the z-direction relative to the lower vented housing 265. In some embodiments, clearance between the lower vented housing 265 and the pitot 207 may enable a slip fit between the lower vented housing 265 and the pitot 207. The slip fit may enable removal of the pitot 207.

In the embodiment depicted in FIG. 2G, the lower vented housing 265 does not include the restrictions 285 and 287. In other embodiments, the lower vented housing 265 may include one or both of the restrictions 285 and 287.

In the embodiment depicted in FIG. 2E, the upper port 235 may include a threaded connection 247. The threaded connection 247 may be configured to attach via a threaded interface to an upper wall stud 245. The upper wall stud 245 may be positioned in the upper opening 290 defined in the vessel 120.

In addition, the second dispenser assembly 200B may include a shuttle 241. The shuttle 241 is configured to be positioned within the shuttle upper housing 273. The shuttle 241 defines a shuttle channel 237 and includes a lower surface 239 that is configured to contact the liquid level gauge structure 220. The shuttle channel 237 surrounds a portion of the riser tube 222 such that the gauge volume 236 is in fluid communication with the internal volume 106. Accordingly, in embodiments including the shuttle 241, a pressure in the internal volume 106 may be present in the shuttle channel 237 and a portion of the gauge volume 236. The pressure may act as the counter pressure discussed elsewhere in this disclosure. The shuttle 241 may also define one or more O-ring retaining structures 279. The O-ring retaining structures 279 may be configured to retain one or more of the O-rings 280.

In the depicted embodiment, the shuttle 241, the O-rings 280, and the liquid level gauge structure 220 are separate components. In some embodiments, one or more of the shuttle 241, the O-rings 280, and the liquid level gauge structure 220 may be a single component. For example, the contact between the lower surface 239 may include a substantially permanent attachment and/or the O-ring retaining structures 279 may include a seal such as the O-rings 280.

The carbonation orifice 249 may be positioned between the riser tube 222 and the upper tube 226. The carbonation orifice 249 may enable the beverage dispenser 100 to be used at a particular pressure while maintaining a flow rate of the beverage at the dispensing tap 130. The carbonation orifice 249 may be interchangeable. For example, multiple carbonation orifices 249 may be available that include varying sized orifices and/or different shapes. Each of the multiple carbonation orifices 249 may enable a particular flow rate for a particular pressure in the internal volume 106. For instance, one of the multiple carbonation orifices 249 may enable the particular flow rate with a first pressure and a second of the multiple carbonation orifices 249 may enable the same particular flow rate with a second pressure. Accordingly, a beverage in the internal volume 106 may be highly carbonated without increasing the flow rate and to have low carbonation with a suitable flow rate (e.g., about 0.75 to about 1.25 fluid ounces per second). The carbonation orifices 249 may be comprised of rubber and inserted into the upper tube 226, then compressed in place by the cinch nut 270. The carbonation orifices 249 may further seal an interface between the cinch nut 270 and the shuttle upper housing 273.

As in the first dispenser assembly 200A, in the embodiment of FIGS. 2D-2G, the upper port 235 penetrates the vessel 120 at the vessel shoulder 250 (also on FIG. 1A). The vessel shoulder 250 may not be at a maximum fill height of the vessel 120. Accordingly, the liquid level gauge structure 220 may only indicate a fluid level below the vessel shoulder 250. In some other embodiments, the upper port 235 may penetrate the vessel 120 above (e.g., having a larger y coordinate) the vessel shoulder 250.

Similar to the first dispenser assembly 200A, the second dispenser assembly 200B of FIGS. 2D-2G includes a configuration that enables simple disassembly for cleaning or other purposes (e.g., changing the carbonation orifice 249). For example, the second dispenser assembly 200B may enable a user to disassemble the vessel 120 and/or the second dispenser assembly 200B such that one or more of the components (e.g., 249, 241, 229, 231, 265, 222, and 234) may be cleaned. In particular, the second dispenser assembly 200B includes the cinch nut 270 that is configured to be a single fastener that maintains the second dispenser assembly 200B in an assembled configuration (as depicted in FIGS. 1A, 1B, and 2E).

In the embodiments depicted in FIGS. 2E, 2F, and 2G, the openings 110/290 may be formed using a welded interface between the exterior wall 190, the interior wall 295, and the lower wall stud 283 or the upper wall stud 245. In particular, in the depicted embodiments, for each of the openings 110/290, the exterior wall 190 includes an angled portion 297 (labeled in FIGS. 2F and 2G only). Similarly, for each of the openings 110/290, the interior wall 295 includes an angled portion 299 (labeled in FIGS. 2F and 2G only). The angled portions 297 and 299 may extend around a perimeter or a circumference of the openings 110/290. The lower wall stud 283 (or the upper wall stud 245) may be positioned in the openings 110/290. The angled portions 297 and 299 may then be welded to the lower wall stud 283 (or the upper wall stud 245). For example, the angled portions 297 and 299 may be TIG welded to the lower wall stud 283 (or the upper wall stud 245).

A welded interface between the angled portions 297 and 299 and the lower wall stud 283 (or the upper wall stud 245) may extend around the circumference of the lower wall stud 283 (or the upper wall stud 245) and may be positioned on an external surface 221 thereof. The welded interface may connect and seal the exterior wall 190, the interior wall 295, and the lower wall stud 283 (or the upper wall stud 245).

In FIGS. 2E, 2F, and 2G, the angled portions 297 and 299 (labeled only in FIGS. 2F and 2G) are oriented in the positive z-direction, which is substantially away from the internal volume 106. In some embodiments, the angled portions 297 and 299 may be oriented in the negative z-direction (similar to the embodiment depicted in FIG. 3A). Alternatively, one of the angled portions 297 and 299 may be oriented in the negative z-direction and the other of the angled portions 297 and 299 may be oriented in the positive z-direction (similar to the embodiment depicted in FIG. 3B).

Figure 3C:
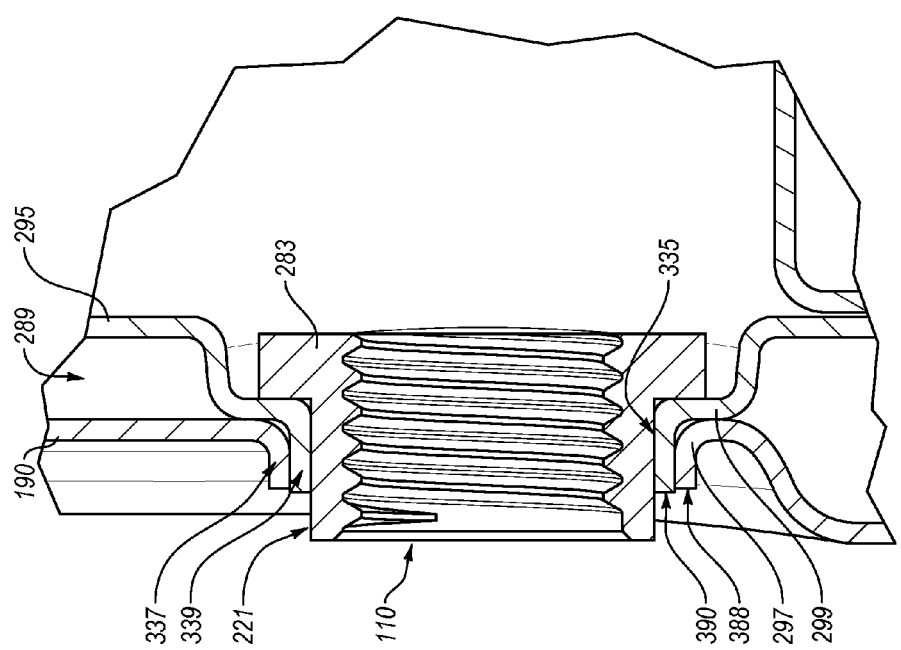
FIG. 3C illustrates another example interface that may be implemented in the dispenser assemblies of FIGS. 2D-2G.

FIG. 3C depicts a detailed view of an example of the lower opening 110 that includes the lower wall stud 283. With respect to FIG. 3C, the lower opening 110 is discussed. The lower opening 110 may be substantially similar to the upper opening 290 with the upper wall stud 245. In the embodiment depicted in FIG. 3C, the angled portions 297 and 299 may extend around the circumference of the lower opening 110. The angled portions 297 and 299 may contact one another or be positioned immediately adjacent to one another. For example, in the depicted embodiment, a substantially horizontal portion 339 of the angled portion 299 (e.g., parallel to the x-axis in FIG. 3C) may contact a substantially horizontal portion 337 of the angled portion 297. The lower wall stud 283 may be positioned in the lower opening 110 defined in the exterior wall 190 and the interior wall 295. The lower wall stud 283 may be positioned in the lower opening 110 such that the external surface 221 may contact or be immediately adjacent to an interior surface 335 of the interior wall 295.

A welded interface may be formed between the angled portions 297 and 299 and the lower wall stud 283. In particular, ends 388 and 390 of the angled portions 297 and 299 may be welded to external surface 221 the lower wall stud 283. For example, the ends 388 and 390 of the angled portions 297 and 299 may be TIG welded to the external surface 221 of the lower wall stud 283. The welded interface may extend around the circumference of the lower wall stud 283. The welded interface may connect and seal the exterior wall 190, the interior wall 295, and the lower wall stud 283. The welded interface may form an air-tight seal to maintain and enable the creation of the vacuum in the vacuum space 289. For example, the welded interface may create a first air-tight seal between the angled portions 297 and 299 and may create a second air-tight seal between the wall stud 283 and the interior surface 335.

In the depicted embodiment, the angled portions 297 and 299 are linearly oriented away from the internal volume 106. For example, the ends 390 and 388 extend away from the internal volume 106. In other embodiments, one or both of the angled portions 297 and 299 may be linearly oriented towards the internal volume 106. In these and other embodiments, the welded interface may include a portion of the angled portions 297 and 299 other than the ends 390 and 388.

FIG. 3D illustrates a sectional view of another example opening 315 that may be implemented in the beverage dispenser of FIGS. 1A-1C. The opening 315 is substantially similar to the openings 110 and 290 except the opening 315 may be defined using a weld joint 309. In the embodiment of FIG. 3D, the interior wall 295 may have an interior wall opening 323 defined therein. Similarly, the exterior wall 190 may have an exterior wall opening 321 defined therein. Additionally, the exterior wall 190 may include an angled portion 317 configured to contact a weld portion 319 of the interior wall 295. The interior wall 295 may be placed within the exterior wall 190. The exterior wall 190 may then be welded to the interior wall 295. For example, the exterior wall 190 may be welded to the interior wall 295 along the weld portion 319 using a resistance welding process, for instance. By including the weld portion 319, thermal energy associated with welding the interior wall 295 to the exterior wall 190 may be minimized.

In the weld joint 309 of FIG. 3D the angled portion 317 is defined in the exterior wall 190 and the interior wall 295 is substantially flat. In some embodiments, the angled portion 317 may be defined in the interior wall 295 and the exterior wall 190 may be substantially flat. Additionally, in some embodiments, the interior wall 295 and the exterior wall 190 may both include angled portions (e.g., 317).

With combined reference to FIGS. 2B-3D, the openings 110/290/315 are manufactured such that the vacuum space 289 may be established and maintained. Accordingly, in embodiments in which the openings 110/290 include a brazed interface, in embodiments in which the openings 110/290 include a weld interface, and in embodiments in which the opening 315 includes welded joints, the interfaces between the interior wall 295 and the exterior wall 190 are air-tight.

Vessels may define openings 110/290/315 manufactured in different ways. For example, a vessel 120 might include a first opening manufactured using a brazed interface and a second opening manufactured using a welded joint or a weld interface. Additionally, the openings 110/290/315 depicted in FIGS. 2A-3D are circular. In some embodiments, the openings 110/290/315 may include another shape, e.g., rectangular, triangular, oval, and the like.

Figure 4A:
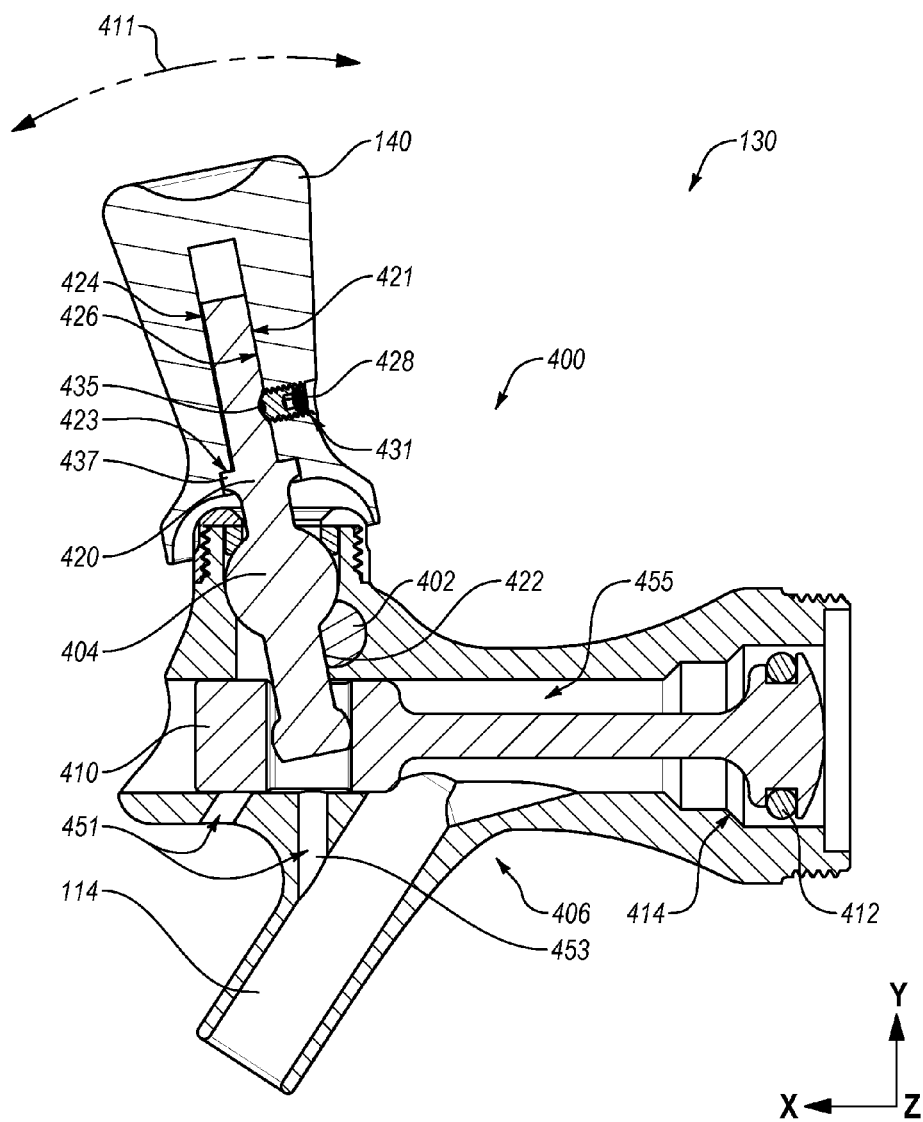
FIG. 4A illustrates an example dispensing tap that may be implemented in the beverage dispenser of FIGS. 1A and 1B.
Figure 4B:
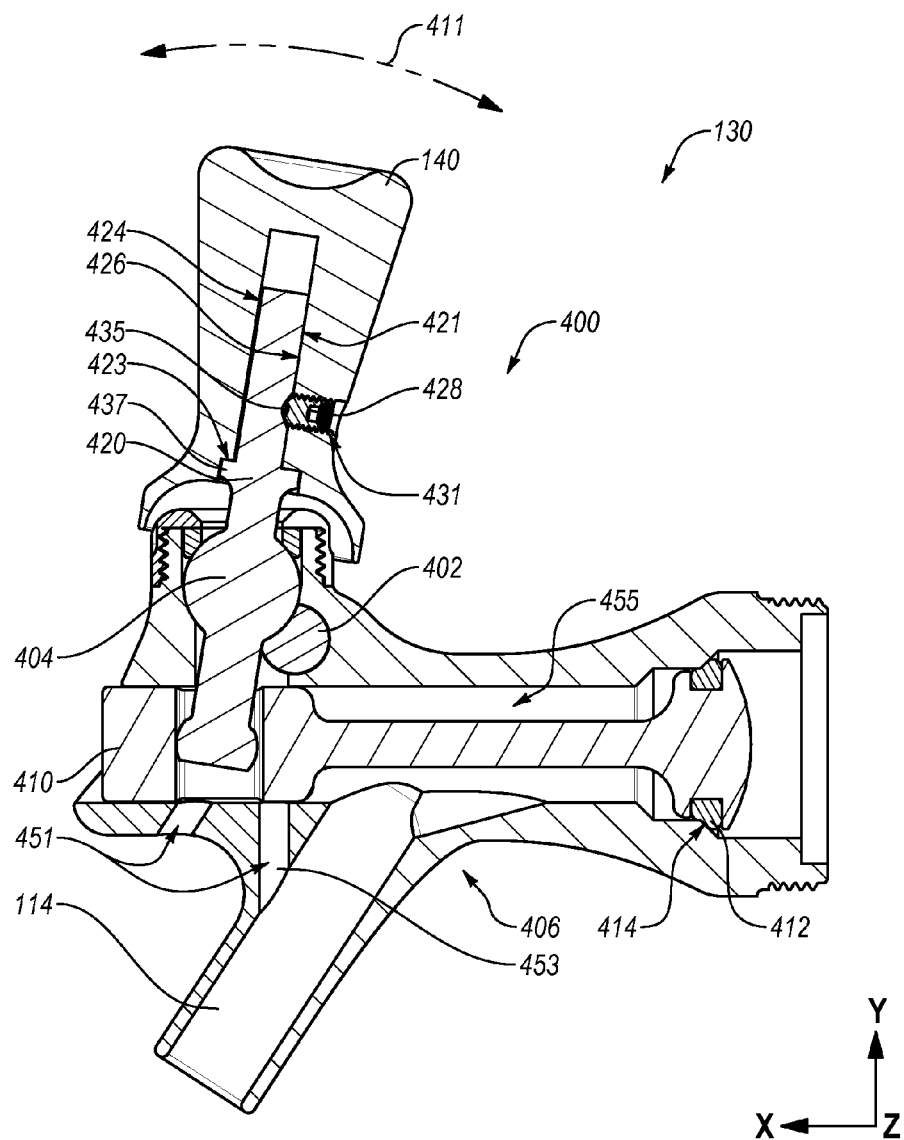
FIG. 4B illustrates another view of the dispensing tap of FIG. 4A.

FIGS. 4A and 4B illustrate sectional views of an example embodiment of the dispensing tap 130 that may be included in the beverage dispenser 100 of FIGS. 1A-1C. For example, with combined reference to FIGS. 1A, 1B, 4A and 4B, the dispensing tap 130 generally enables a user to dispense the beverage 104 from the beverage dispenser 100. In addition, the dispensing tap 130 may enable the beverage dispenser to be transported without the beverage accidentally being dispensed. In particular, some embodiments of the beverage dispenser 100 are configured to be portable. Accordingly, the dispensing tap 130 may be configured to ensure the beverage 104 remains in the beverage dispenser 100 during transportation. Moreover, the dispensing tap 130 may be configured to receive customizable/interchangeable tap handles (e.g., 140). The tap handles may appeal to users and/or provide identification as to a particular beverage stored in the beverage dispenser 100.

Referring to FIGS. 4A and 4B, the dispensing tap 130 may include a locking mechanism 400. The locking mechanism 400 allows a user to reduce or prevent a beverage from being accidentally dispensed. The locking mechanism 400 may include a lock pin 402. The lock pin 402 is configured to be moved in the z-direction of FIGS. 4A and 4B to engage or disengage a rocker 404 of a rocker valve 406. When the lock pin 402 is disengaged with the rocker 404 as shown in FIG. 4A, the lock pin 402 allows actuation of the rocker valve 406. When the lock pin 402 is engaged from the rocker 404 as shown in FIG. 4B, the lock pin 402 prevents actuation of the rocker valve 406.

With reference to FIG. 4B, the dispensing tap 130 is depicted in a locked position and a shut position. In the shut position, the tap handle 140 is moved in substantially the negative x-direction. In some embodiments, the movement of the tap handle 140 is somewhat arced according to arrow 411 included in FIGS. 4A and 4B. The movement of the tap handle 140 in substantially the negative x-direction moves the dispenser shuttle 410 in the x-direction. When the dispenser shuttle 410 is moved in the x-direction, a shuttle seal 412 contacts a sealing surface 414 and prevents fluid from exiting the tap exit 114.

To lock the dispensing tap 130 in the shut position, the lock pin 402 may be moved in the z-direction. In some embodiments, the lock pin 402 may include a rocker recess 422 (FIG. 4A only) defined in the lock pin 402. The rocker recess 422 is substantially formed on the lock pin 402 such that when the rocker recess 422 is aligned with the rocker 404, the rocker 404 may pivot. However, when the rocker recess 422 is not aligned, the rocker 404 interferes with the lock pin 402 and may not pivot. Thus, the lock pin 402 restricts motion of the tap stem 420 in the x-direction.

With reference to FIG. 4A, the dispensing tap 130 is depicted in an unlocked position and an open position. In the open position, the tap handle 140 is moved in the x-direction, which moves the dispenser shuttle 410 in the negative x-direction. When the dispenser shuttle 410 is moved in the negative x-direction, the shuttle seal 412 does not contact the sealing surface 414 and allows fluid to exit the tap exit 114. To unlock the dispensing tap 130 in the open position, the lock pin 402 may be moved in the z-direction. In some embodiments, the locking mechanism 400 may include a detent ball, a retaining spring, and a ball detent set screw. The detent ball may apply a force against the lock pin 402 which may increase a force involved in moving the lock pin 402 in the z-direction. The retaining spring and the ball detent set screw may adjust the force imposed against the lock pin 402 by the detent ball. Additionally, in some embodiments, the detent ball may be received in one or more detents. The detents may be positioned on the lock pin 402 to correspond to a locked position (e.g., shown in FIG. 4B) and an unlocked position (e.g., shown in FIG. 4A).

The tap handle 140 may be one of many tap handles that may be positioned on the tap stem 420. To enable interchangeability of the tap handles, the tap stem 420 includes a locating flat 421 and a rocker pedestal 423.

The tap handle 140 that is configured to be positioned on the tap stem 420 includes a stem bore 424. The stem bore 424 corresponds to the tap stem 420. For example, the stem bore 424 includes a flat portion 426 that corresponds to the locating flat 421. The locating flat 421 may rotationally orient the tap handle 140. In addition, the locating flat 421 is a stop for a set screw 428. For instance, the tap handle 140 or another tap handle having a corresponding stem bore 424 is positioned on the tap stem 420. The set screw 428 is then threaded into a threaded opening 431 defined in the tap handle 140.

The set screw 428 may contact a set screw recess 435 of the locating flat 421. The set screw 428 is tightened against the set screw recess 435 to secure the tap handle 140 to the tap stem 420. The stem bore 424 may also include a handle seat 437. The handle seat 437 is configured to receive the rocker pedestal 423. The handle seat 437 positions the tap handle 140 such that the rocker valve 406 can be actuated without interfering with the dispensing tap 130.

In some embodiments, the dispensing tap 130 may include spout penetrations 451. The spout penetrations 451 may be defined on sloped surface 453 leading to the tap exit 114. The spout penetrations 451 may enable a small amount of air to enter a tap volume 455, which may prevent or substantially prevent a portion of a beverage (e.g., 104 of FIG. 1A) from being retained in the tap volume 455 and/or the tap exit 114. For instance, when the beverage is being dispensed, it may substantially fill the tap volume 455 and the tap exit 114. When the dispensing tap 130 is placed in the shut position, some of the beverage may be retained in the tap volume 455 and/or the tap exit 114 due to a vacuum forming within the tap volume 455 and maintained by the shuttle seal 412. Inclusion of the spout penetrations 451 enables air to enter the tap volume 455 allowing the beverage to drain from the tap exit 114.

A cross-sectional area of the spout penetrations 451 may be small relative to a cross-sectional area of the tap exit 114. For example, the diameter of the tap exit 114 may be about 5 to 30 times the diameter of the spout penetrations 451 in some embodiments. The relatively small cross-sectional area of the spout penetration 451 may reduce or prevent the beverage from exiting via the spout penetration 451 while the beverage is being dispensed. In some embodiments, the dispenser shuttle 410 blocks the spout penetrations 451 when in an open position.

Figure 7:
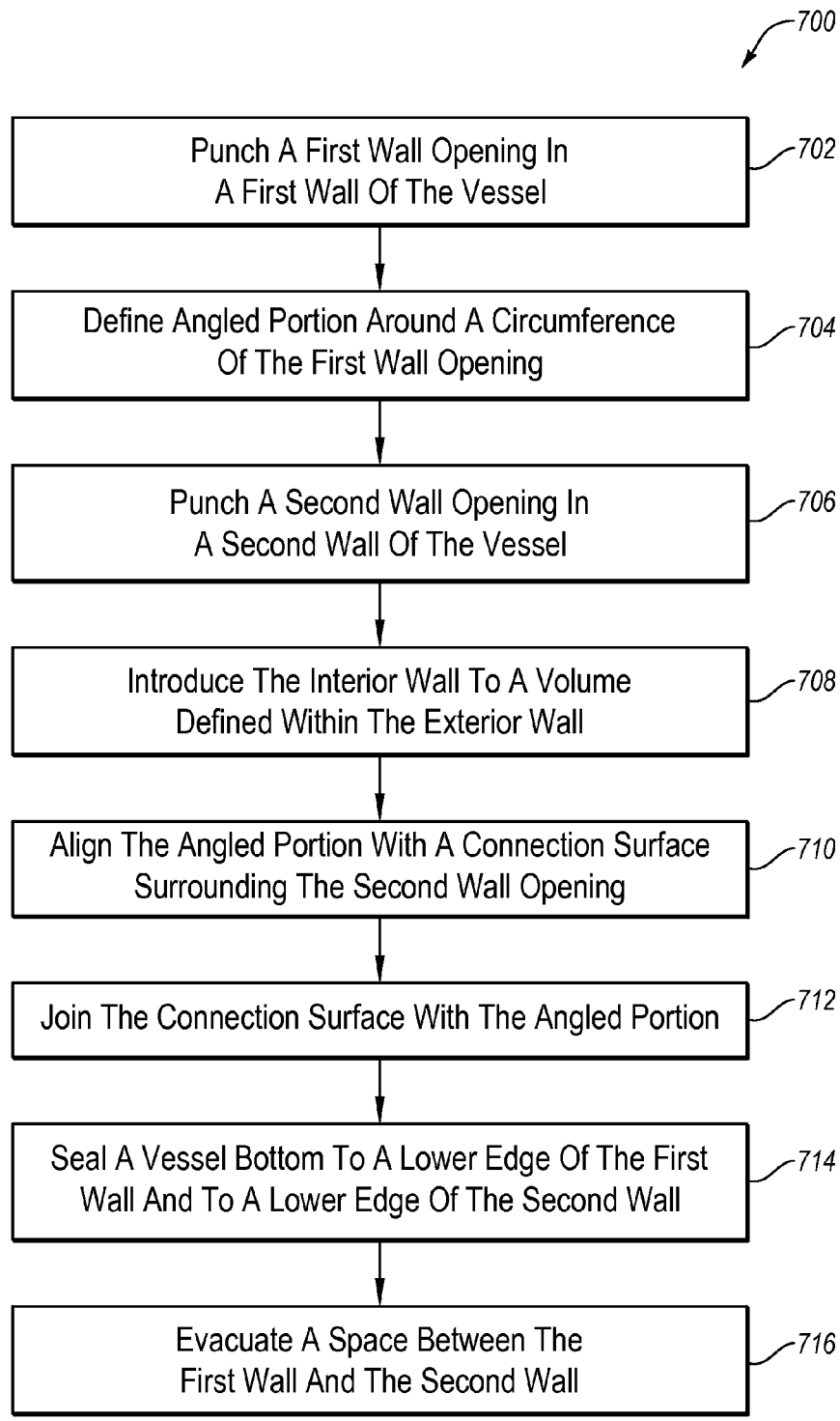
FIG. 7 is a flowchart that depicts an example method of manufacturing an opening of a vessel that includes a double-wall vacuum space.

FIG. 7 is a flowchart that depicts an example method 700 of manufacturing an opening of a vessel that includes a double-wall vacuum space. Although illustrated as discrete blocks, various blocks may be divided into additional blocks, combined into fewer blocks, or eliminated, depending on the desired implementation. For example a beverage dispenser such as the beverage dispenser 100 of FIGS. 1A and 1B may include a vessel such as the vessel 120 that includes a double-wall vacuum space and at least one opening such as the openings 110/290 manufactured according to the method 700.

Figure 5:
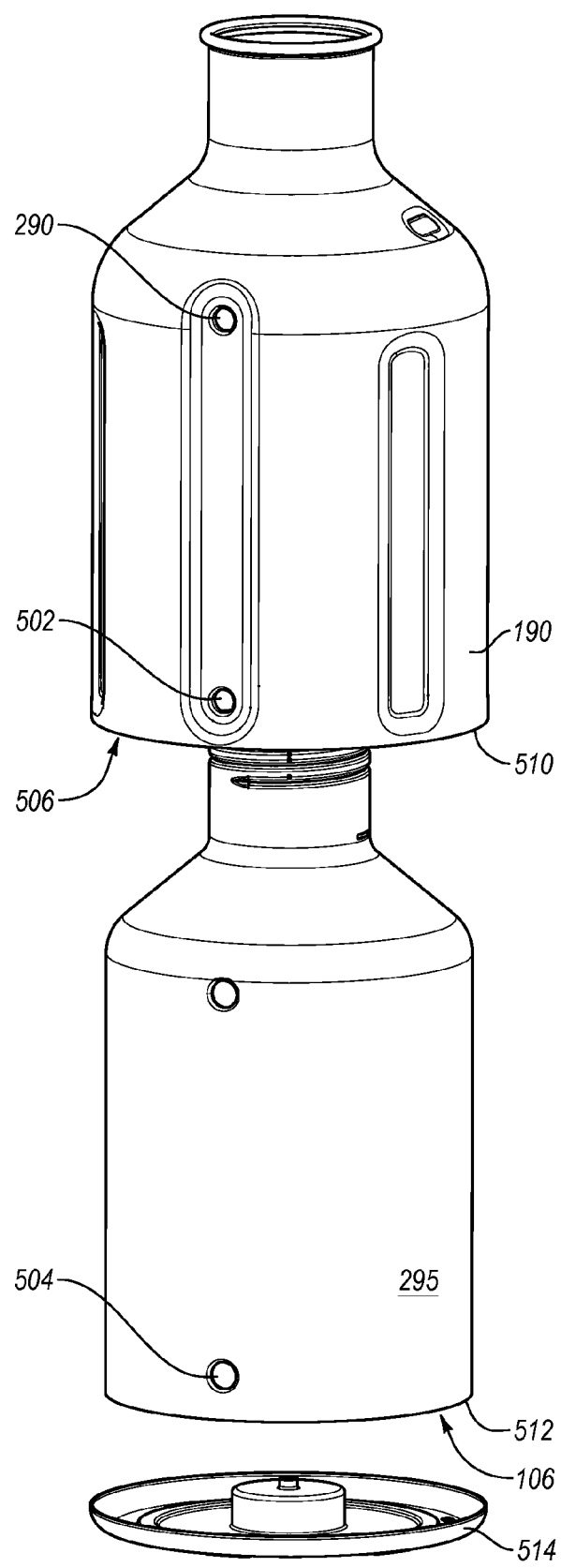
FIG. 5 illustrates a partially exploded view of the beverage dispenser of FIGS. 1A and 1B.
Figure 6A:
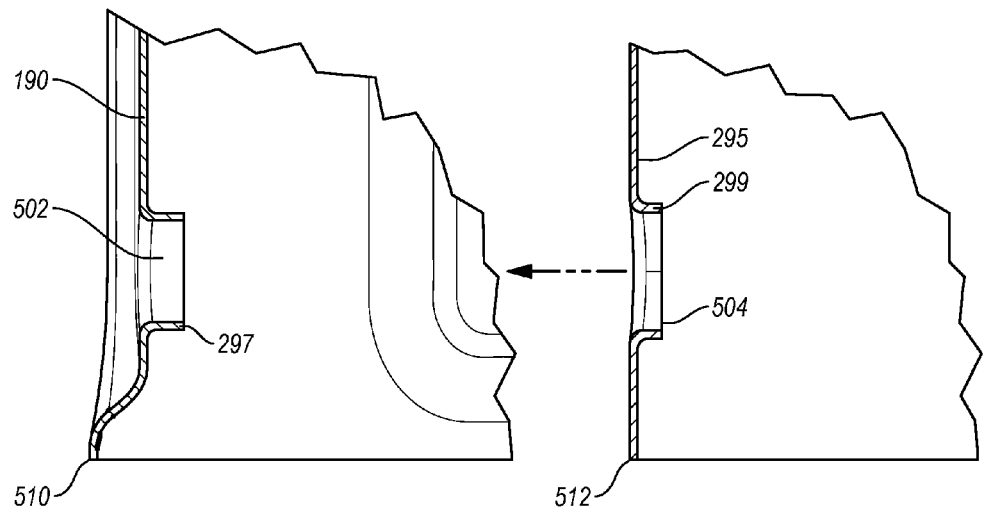
FIG. 6A illustrates a detailed view of an example lower opening that may be implemented in the beverage dispenser of FIGS. 1A and 1B.
Figure 6B:
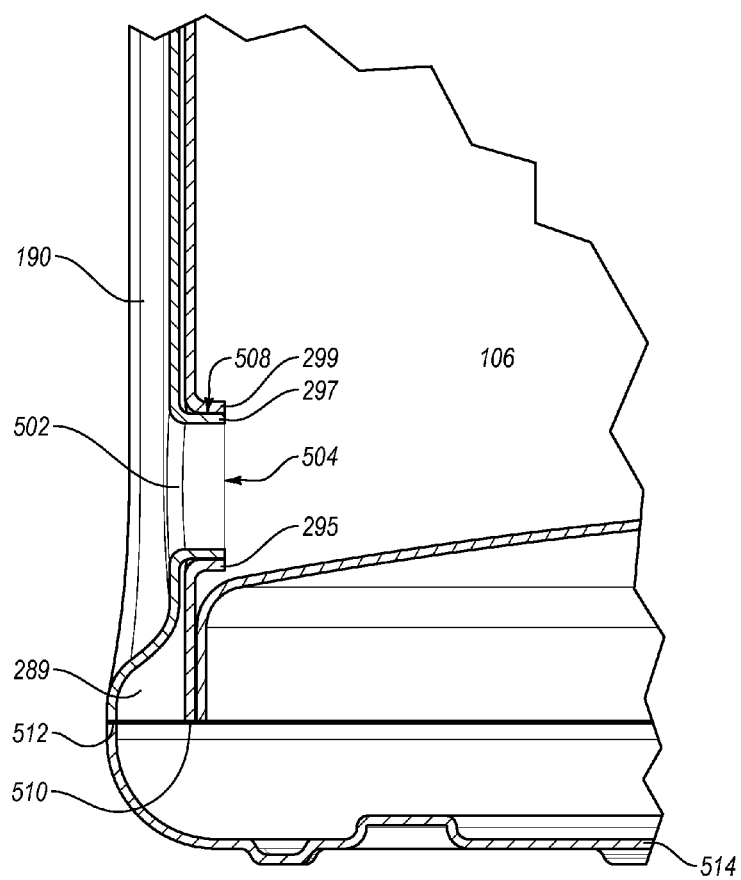
FIG. 6B illustrates another detailed view of the lower opening of FIG. 6A.

The method 700 is described with reference to FIGS. 5, 6A, and 6B that illustrate portions of the beverage dispenser 100 of FIGS. 1A and 1B. In particular, FIG. 5 includes a partially exploded view of the beverage dispenser 100 of FIGS. 1A and 1B with multiple components (e.g., 200 (e.g., 200A and 200B), 145, and 138) omitted. FIGS. 6A and 6B illustrate a detailed view of the lower opening 110.

The method 700 may begin at block 702 in which a first wall opening may be punched in a first wall of the vessel. For example, with reference to FIGS. 6A and 6B, a first wall may include the exterior wall 190. A first wall opening 502 may be punched or otherwise defined in the exterior wall 190.

At block 704, an angled portion may be defined around a circumference of the first wall opening. For example, with reference to FIGS. 6A and 6B, the angled portion 297 may be defined around the circumference of the first wall opening 502. At block 706, a second wall opening may be punched in a second wall of the vessel. For example, with reference to FIGS. 5, 6A, and 6B, a second wall may include the interior wall 295. A second wall opening 504 may be defined in the interior wall 295. At block 708, the interior wall may be introduced to a volume defined within the exterior wall. For example, with reference to FIGS. 5, 6A, and 6B, the interior wall 295 may be introduced to a volume 506 defined by the exterior wall 190.

At block 710, the angled portion may be aligned with a connection surface surrounding the second wall opening. For example, with reference to FIGS. 6A and 6B, the angled portion 297 may be aligned with a connection surface surrounding the second wall opening 504. In the example depicted in FIGS. 5, 6A, and 6B the connection surface may include the second angled portion 299 defined around a circumference of the second wall opening 504. The angled portion 297 may be aligned with the second angled portion 299 such that a brazed gap 508 exists between the angled portion 297 defined around the first wall opening 502 and the second angled portion 299. The brazed gap 508 may be defined to receive an amount of braze to create an air-tight seal between the angled portion 297 defined around the first wall opening 502 and the second angled portion 299.

In some embodiments, such as that depicted in FIG. 3C, the second wall opening may include the interior wall opening 323 and the connection surface may include a weld portion 319 that is defined around a circumference of the interior wall opening 323.

At block 712, the connection surface may be joined with the angled portion 297. For example, with reference to FIG. 6B, the angled portion 297 may be joined with the second angled portion 299 as depicted in FIG. 6B and also depicted in FIGS. 3A, 3B, and 2C. In some embodiments such as those depicted in FIG. 6B, braze may be applied to the brazed gap 508 and the joining the connection surface (e.g., the second angled portion 299) with the angled portion 297 may include heating the first wall (the exterior wall 190) and the second wall (the interior wall 295) to activate the braze. In some embodiments such as those depicted in FIG. 3C, the joining may include resistively welding the angled portion 317 to the weld portion 319 or applying a fillet weld.

At block 714, a vessel bottom may be sealed to a lower edge of the first wall and to a lower edge of the second wall. For example, with reference to FIGS. 5, 6A, and 6B, a lower edge 510 of the exterior wall 190 and a lower edge 512 of the interior wall 295 may be sealed to a vessel bottom 514. In FIGS. 5 and 6A, the vessel bottom 514 is depicted exploded from the lower edges 510 and 512. In FIG. 6B, the vessel bottom 514 is depicted sealed from the lower edges 510 and 512.

In some embodiments, the vessel bottom 514 may be comprised of an outer bottom and an inner bottom. The outer bottom may be may be configured to correspond to the lower edge 510 of the exterior wall 190 and the inner bottom may correspond to the lower edge 512 of the interior wall 295. In these and other embodiments, the method 700 may include two steps for sealing the vessel bottom. For example, the method 700 may include sealing the outer bottom to the lower edge 510 of the exterior wall and sealing the inner bottom to the lower edge of the interior wall.

At block 716, a space between the first wall and the second wall may be evacuated. For example, with reference to FIG. 6B the vacuum space 289 may be evacuated. For example, the vacuum space 289 may be evacuated using a vacuum pump.

One skilled in the art will appreciate that, for this and other procedures and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the disclosed embodiments. For example, the method 700 may include positioning a heat sink in the first wall opening after the angled portion defined around the first wall opening is aligned with the second angled portion and following the heating, the method 700 may include removing the heat sink from the first wall opening.

Figure 10:
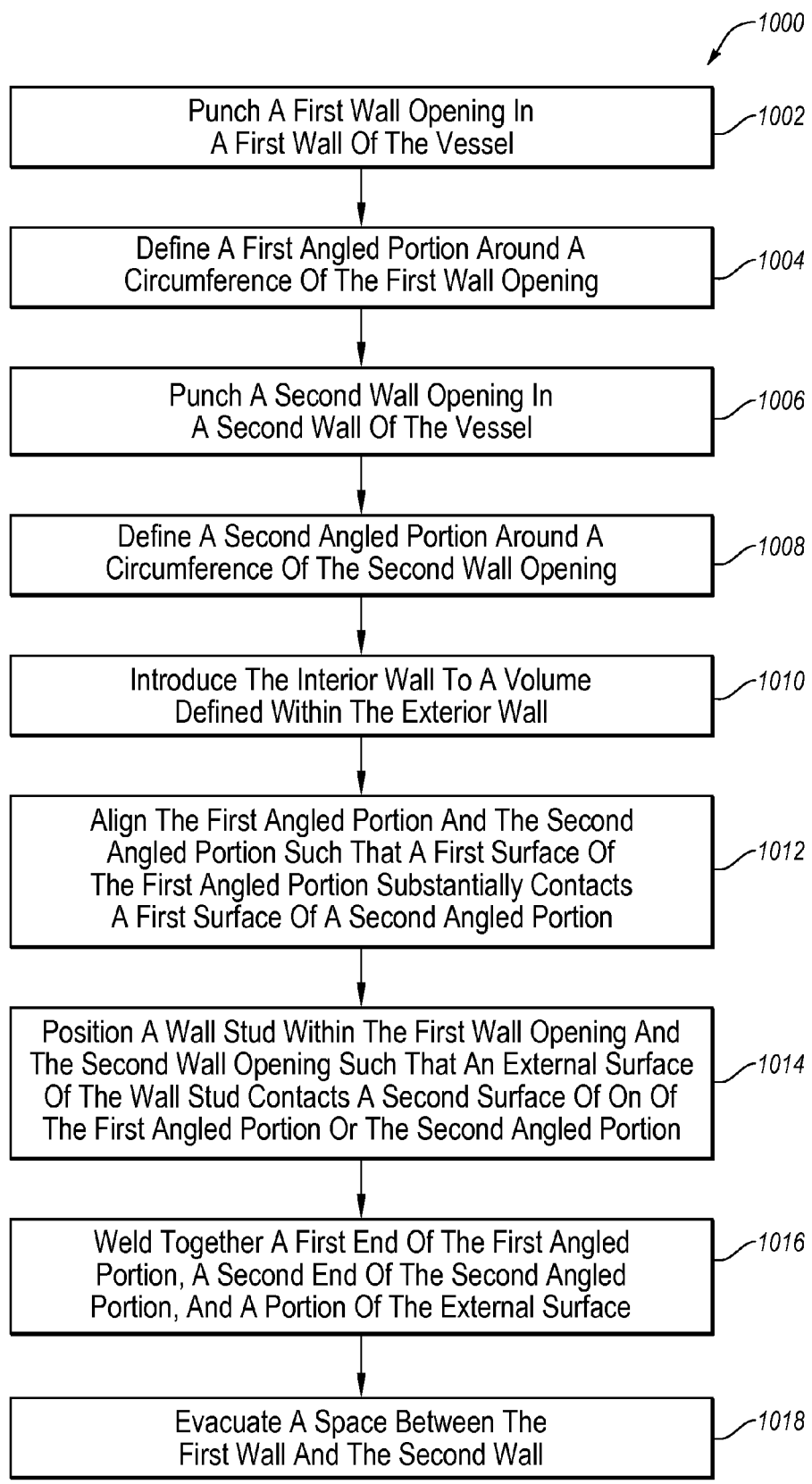
FIG. 10 is a flowchart that depicts an example method of manufacturing an opening of a vessel that includes a double-wall vacuum space, all in accordance with at least one embodiment described herein.

FIG. 10 is a flowchart that depicts an example method 1000 of manufacturing an opening of a vessel that includes a double-wall vacuum space. Although illustrated as discrete blocks, various blocks may be divided into additional blocks, combined into fewer blocks, or eliminated, depending on the desired implementation. For example a beverage dispenser such as the beverage dispenser 100 of FIGS. 1A and 1B may include a vessel such as the vessel 120 that includes a double-wall vacuum space and at least one opening such as the openings 110/290 manufactured according to the method 1000.

Figure 8:
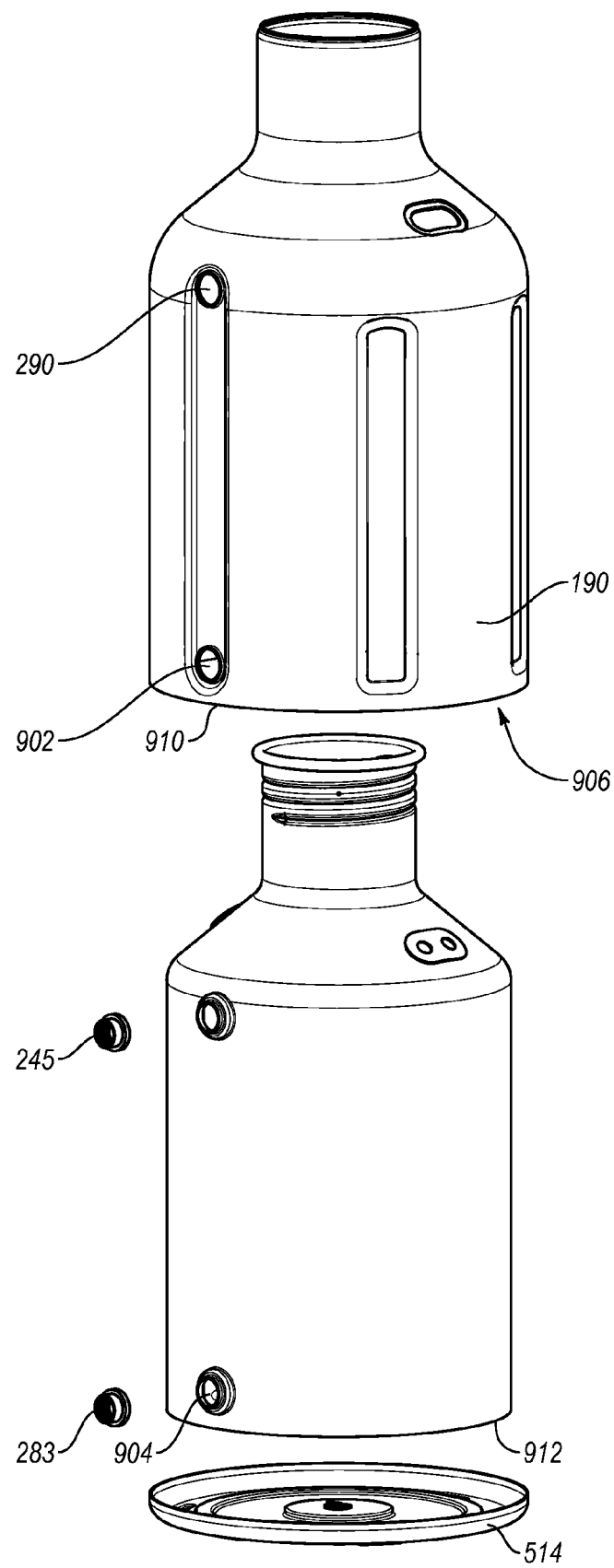
FIG. 8 illustrates a partially exploded view of the beverage dispenser of FIGS. 1A and 1B.
Figure 9A:
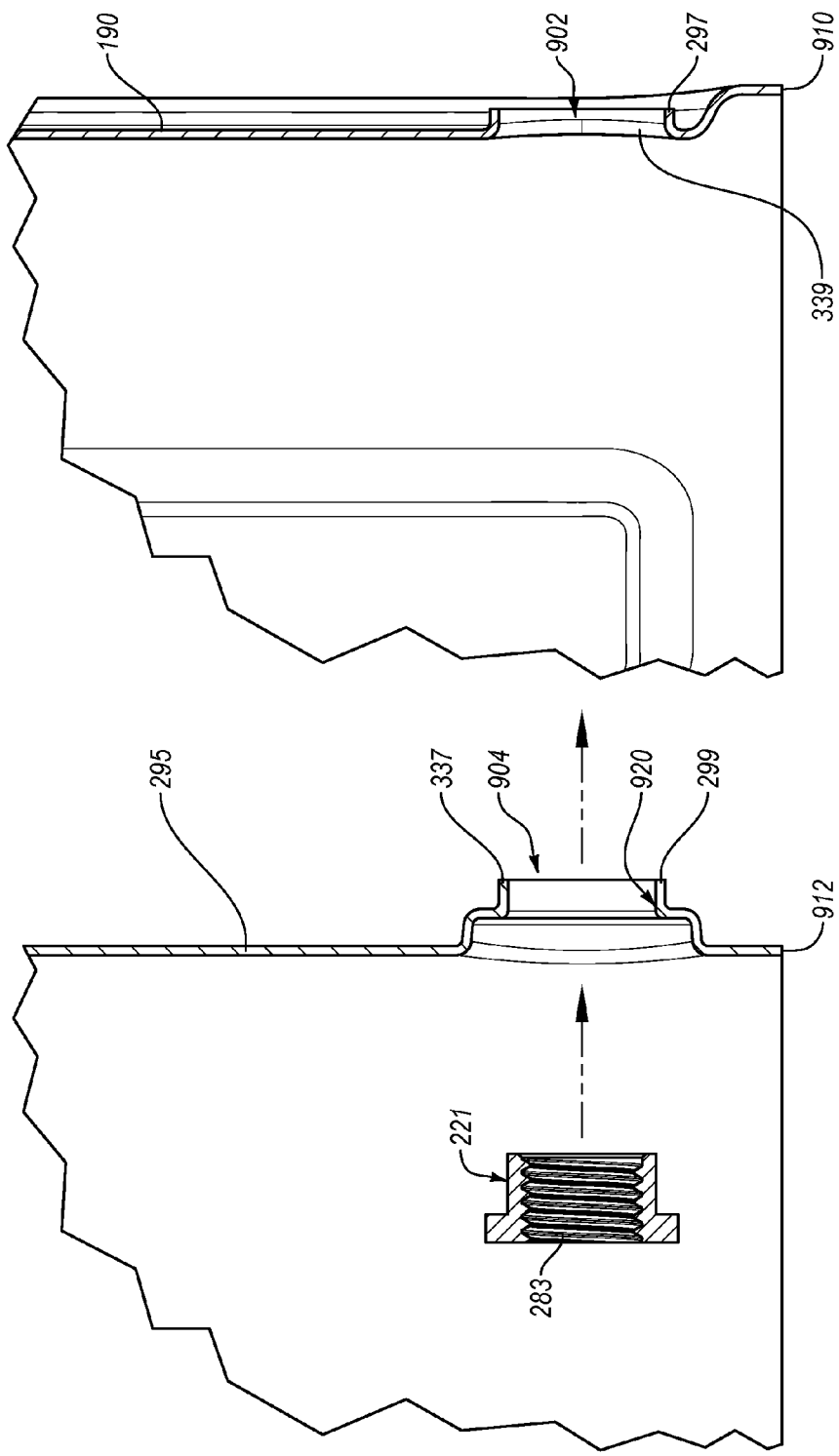
FIG. 9A illustrates a detailed view of an example lower opening that may be implemented in the beverage dispenser of FIGS. 1A and 1B.
Figure 9B:
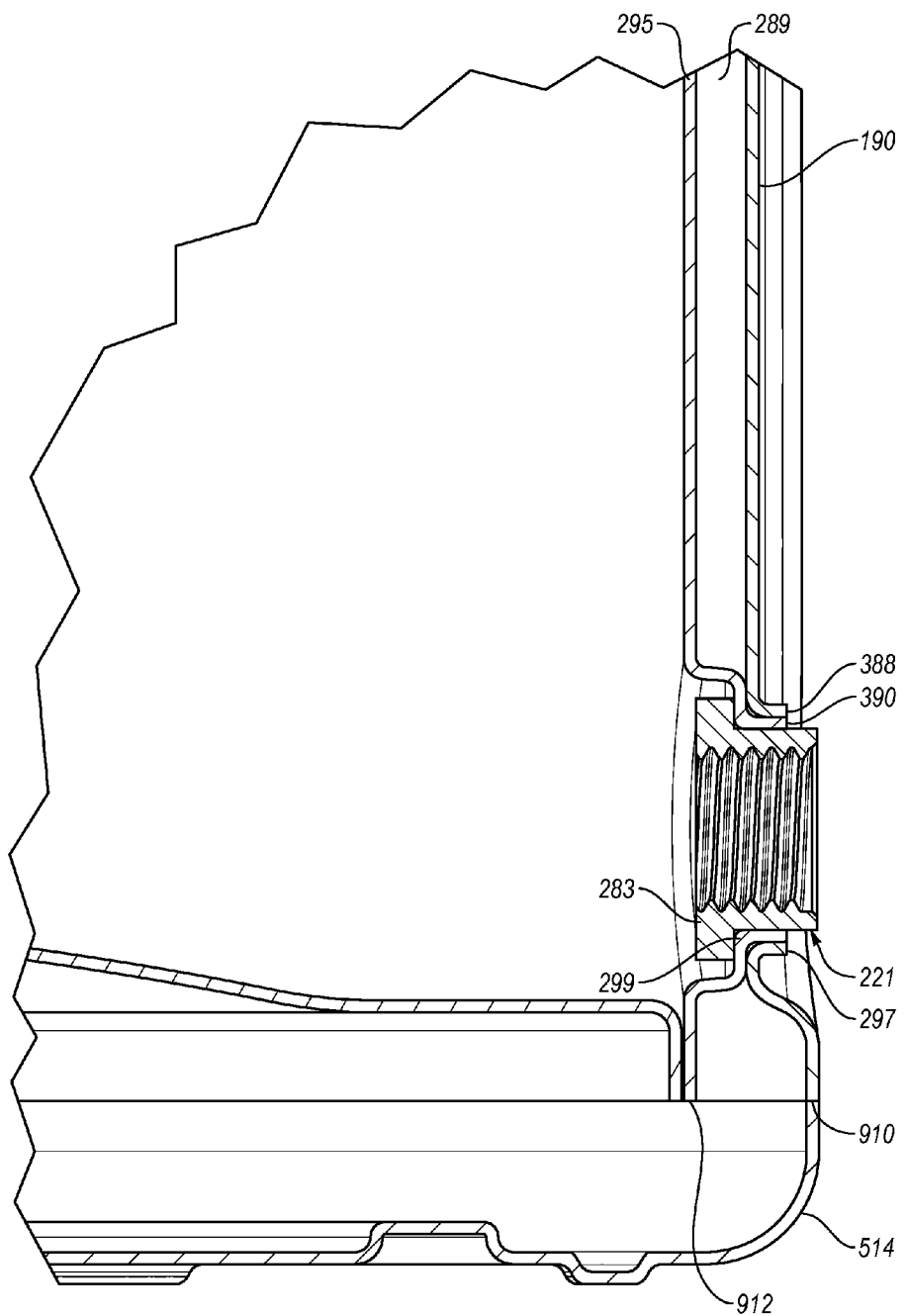
FIG. 9B illustrates another detailed view of the lower opening of FIG. 9A.

The method 1000 is described with reference to FIGS. 8, 9A and 9B that illustrate portions of the beverage dispenser 100 of FIGS. 1A and 1B. In particular, FIG. 8 includes a partially exploded view of the beverage dispenser 100 of FIGS. 1A and 1B with multiple components (e.g., 200 (e.g., 200A and 200B), 145, and 138) omitted. FIGS. 9A and 9B illustrate a detailed view of the lower opening 110.

The method 1000 may begin at block 1002 in which a first wall opening may be punched in a first wall of the vessel. For example, with reference to FIGS. 9A and 9B, a first wall may include the exterior wall 190. A first wall opening 902 may be punched or otherwise defined in the exterior wall 190.

At block 1004, a first angled portion may be defined around a circumference of the first wall opening. For example, with reference to FIGS. 9A and 9B, the angled portion 297 may be defined around the circumference of the first wall opening 902. At block 1006, a second wall opening may be punched in a second wall of the vessel. For example, with reference to FIGS. 8, 9A, and 9B, a second wall may include the interior wall 295. A second wall opening 904 may be defined in the interior wall 295.

At block 1008, a second angled portion may be defined around a circumference of the second wall opening. For example, with reference to FIGS. 9A and 9B, the angled portion 299 may be defined around the circumference of the second wall opening 904. At block 1010, the interior wall may be introduced to a volume defined within the exterior wall. For example, with reference to FIGS. 8, 9A, and 9B, the interior wall 295 may be introduced to a volume 906 (FIG. 8) defined by the exterior wall 190.

At block 1012, the first angled portion and the second angled portion may be aligned. For example, the first angled portion and the second angled portion may be aligned such that a first surface of the first angled portion substantially contacts or contacts a first surface of a second angled portion. With reference to FIGS. 9A and 9B, the first angled portion 297 and the second angled portion 299 may be aligned such that a first surface of the horizontal portion 339 of the first angled portion 297 substantially contacts or contacts a first surface of the horizontal portion of the second angled portion 299.

At block 1014, a wall stud may be positioned within the first wall opening and the second wall opening such that an external surface of the wall stud contacts a second surface of one of the first angled portion or the second angled portion. For example, with reference to FIGS. 9A and 9B, the lower wall stud 283 may be positioned within the first wall opening 902 and the second wall opening 904 such that an external surface 221 of the wall stud 283 contacts a second surface 920 of the second angled portion 299.

At block 1016, a first end of the first angled portion, a second end of the second angled portion and a portion of the external surface may be welded together. For example, with reference to FIG. 9B, the first end 388 of the first angled portion 297, the second end 390 of the second angled portion 299 and a portion of the external surface 221 may be welded together. A weld interface between the first end of the first angled portion, the second end of the second angled portion, and the portion of the external surface creates a first air-tight seal between the first angled portion and the second angled portion and creates a second air-tight seal between the wall stud and the one of the first angled portion or the second angled portion that includes the second surface that contacts the wall stud.

At block 1018, a space between the first wall and the second wall may be evacuated. For example, with reference to FIG. 9B the vacuum space 289 may be evacuated. For example, the vacuum space 289 may be evacuated using a vacuum pump.

In some embodiments, the method 1000 may include sealing a vessel bottom to a lower edge of the first wall and to a lower edge of the second wall. Sealing the vessel bottom may occur prior to the space between the first wall and the second wall being evacuated. For example, with reference to FIGS. 8, 9A, and 9B, a lower edge 910 of the exterior wall 190 and a lower edge 912 of the interior wall 295 may be sealed to a vessel bottom 514. In FIG. 8, the vessel bottom 514 is depicted exploded from the lower edges 910 and 912. In FIG. 9B, the vessel bottom 514 is depicted sealed to the lower edges 910 and 912.

In some embodiments, the vessel bottom 514 may be comprised of an outer bottom and an inner bottom. The outer bottom may be may be configured to correspond to the lower edge 910 of the exterior wall 190 and the inner bottom may correspond to the lower edge 912 of the interior wall 295. In these and other embodiments, the method 1000 may include two steps for sealing the vessel bottom. For example, the method 1000 may include sealing the outer bottom to the lower edge 910 of the exterior wall 190 and sealing the inner bottom to the lower edge 912 of the interior wall 295.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present invention have been described in detail, it should be understood that various changes, substitutions, and alterations could be made hereto without departing from the spirit and scope of the invention.

What is claimed is:

1. A beverage dispenser comprising:
   a vessel that defines an internal volume, a lower opening, and an upper opening;
   a dispensing tap;
   a dispenser assembly; and
   a dispensing tube that couples the dispensing tap to the dispenser assembly, wherein the dispenser assembly includes:
   a liquid level gauge structure,
   a riser tube that is positioned within a liquid level gauge structure, wherein the riser tube defines a riser volume, and wherein a gauge volume is defined between the liquid level gauge structure and the riser tube,
   a lower housing, a portion of which penetrates the vessel at the lower opening, wherein the lower housing is configured such that at the lower housing, the riser volume and the gauge volume are in fluid communication with the internal volume, and
   an upper housing, a portion of which penetrates the vessel at the upper opening, wherein the upper housing is configured such that at the upper housing, the internal volume is in fluid communication with only the gauge volume and the riser tube is in fluid communication with a volume defined by the dispensing tube.

2. The beverage dispenser of claim 1, further comprising a regulator cap assembly that is configured to at least partially seal a mouth of the vessel and to regulate a pressure applied to a beverage retained in the internal volume, wherein the pressure applied to the beverage forces the beverage into the riser volume and the gauge volume via the lower housing and provides a counter pressure to gauge volume at the upper housing.

3. The beverage dispenser of claim 1, wherein:
   in an assembled configuration of the dispenser assembly, a first end of the riser tube and a first end of the liquid level gauge structure are secured to the vessel by the upper housing and a second end of the riser tube and a second end of the liquid level gauge structure are secured to the vessel by the lower housing;
   the dispenser assembly includes a cinch nut that is configured to be attached to an upper housing; and
   the cinch nut is a single fastener that maintains the dispenser assembly in the assembled configuration.

4. The beverage dispenser of claim 1, further comprising a shuttle that is configured to be positioned in the upper housing, wherein:
   the shuttle defines a shuttle channel that surrounds a portion of the riser tube such that the gauge volume is in fluid communication with the internal volume;
   the shuttle includes a lower surface that is configured to contact the liquid level gauge structure; and
   the shuttle defines one or more O-ring retaining structures configured to retain one or more of O-rings.

5. The beverage dispenser of claim 1, wherein:
   the lower housing includes a lower vented housing that defines a pressure gauge volume, a lower volume, and a gauge volume channel;
   the lower volume is in fluid communication with the riser volume via a first restriction; and the gauge volume is in fluid communication with the lower volume via a second restriction and the gauge volume channel.

6. The beverage dispenser of claim 1, further comprising a pitot, wherein:
the lower housing includes a lower vented housing that defines a pressure gauge volume, a lower volume, and a gauge volume channel;
the pressure gauge volume is fluidly coupled to the internal volume via the pitot;
an outer lower housing volume is defined between the pitot and the lower vented housing; and
the riser volume is fluidly coupled to the internal volume via the outer lower housing volume.

7. The beverage dispenser of claim 1, further comprising a pressure gauge received by the lower housing such that the pressure gauge indicates a pressure in the internal volume, wherein:
the liquid level gauge structure includes a viewing window that is substantially transparent and graduations that indicate a volume of a beverage in the gauge volume; and
the dispensing tap includes a rocker valve and a lock pin, wherein the lock pin is configured to engage a rocker of the rocker valve to prevent actuation of the rocker valve.

8. The beverage dispenser of claim 1, wherein the vessel includes a double-wall construction that includes a vacuum space defined between an exterior wall of the vessel and an interior wall of the vessel.

9. The beverage dispenser of claim 8, wherein:
one or both of the lower opening and the upper opening include an air-tight brazed interface formed along an angled portion of the exterior wall and an angled portion of the interior wall; and
the angled portion of the exterior wall and the angled portion of the interior wall are oriented towards the internal volume of the vessel.

10. The beverage dispenser of claim 8, wherein one or both of the lower opening and the upper opening include an air-tight welded joint formed along a weld portion of the interior wall and an angled portion of the exterior wall.

* * * * *